US012637559B2

(12) United States Patent
Coffey et al.

(10) Patent No.: US 12,637,559 B2
(45) Date of Patent: May 26, 2026

(54) PRESSURE SENSITIVE ADHESIVES COMPRISING PROPYLENE-ETHYLENE(-DIENE) COPOLYMERS

(71) Applicant: ExxonMobil Chemical Patents Inc., Baytown, TX (US)

(72) Inventors: James N. Coffey, League City, TX (US); Zhifeng Bai, Houston, TX (US); Scott H. Loyd, League City, TX (US); Alexandra K. Valdez, Webster, TX (US); Chaky D. Muankaew, League City, TX (US); Eleni E. Stamatakis, Houston, TX (US); Adam P. Hamilton, Houston, TX (US); Rajesh Puthenkovilakom Raja, Baytown, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 720 days.

(21) Appl. No.: 17/624,891

(22) PCT Filed: Jul. 17, 2020

(86) PCT No.: PCT/US2020/042619

§ 371 (c)(1),
(2) Date: Jan. 5, 2022

(87) PCT Pub. No.: WO2021/011900

PCT Pub. Date: Jan. 21, 2021

(65) Prior Publication Data

US 2022/0267649 A1 Aug. 25, 2022

Related U.S. Application Data

(60) Provisional application No. 62/875,196, filed on Jul. 17, 2019.

(51) Int. Cl.
*C08L 23/16* (2006.01)
*B60C 1/00* (2006.01)
(Continued)

(52) U.S. Cl.
CPC ............ *C08L 23/16* (2013.01); *B60C 1/0008* (2013.01); *B60C 1/0025* (2013.01);
(Continued)

(58) Field of Classification Search
CPC ...... C08L 23/16; C08L 23/22; C08L 2205/02; C08L 2205/025; C08F 210/02; C08F 210/06; C09J 123/16; C09J 423/16
(Continued)

(56) References Cited

U.S. PATENT DOCUMENTS

2008/0319130 A1 12/2008 Chang
2010/0093941 A1 4/2010 Akai et al.

FOREIGN PATENT DOCUMENTS

WO 2005/103123 11/2005
WO 2011/034045 3/2011
(Continued)

*Primary Examiner* — Ruiyun Zhang
(74) *Attorney, Agent, or Firm* — Fletcher Yoder P.C.

(57) ABSTRACT

A pressure-sensitive adhesive may comprise: about 18 wt % to about 90 wt % of a propylene-ethylene(-diene) (PE(D)M) copolymer; about 10 wt % to about 65 wt % of a tackifier; and 0 wt % to about 40 wt % of an oil. The PE(D)M copolymer may comprise: (a) about 60 wt % to about 99 wt % propylene, (b) about 1 wt % to about 40 wt % ethylene or a C4 to C22 alpha-olefin, and (c) 0 wt % to about 20 wt % diene, wherein the PE(D)M copolymer has a heat of fusion of about 15 J/g or less.

19 Claims, 8 Drawing Sheets

(51) Int. Cl.

| | |
|---|---|
| ***C08F 4/602*** | (2006.01) |
| ***C08F 4/6592*** | (2006.01) |
| ***C08F 210/02*** | (2006.01) |
| ***C08F 210/06*** | (2006.01) |
| ***C08J 3/22*** | (2006.01) |
| ***C08J 3/24*** | (2006.01) |
| ***C08K 5/01*** | (2006.01) |
| ***C08L 7/00*** | (2006.01) |
| ***C08L 9/00*** | (2006.01) |
| ***C08L 23/22*** | (2006.01) |
| ***C08L 23/283*** | (2025.01) |
| ***C09J 123/16*** | (2006.01) |
| *C08F 210/16* | (2006.01) |

(52) U.S. Cl.

CPC .......... *C08F 4/6028* (2013.01); *C08F 4/6592* (2013.01); *C08F 210/02* (2013.01); *C08F 210/06* (2013.01); *C08J 3/22* (2013.01); *C08J 3/24* (2013.01); *C08K 5/01* (2013.01); *C08L 7/00* (2013.01); *C08L 9/00* (2013.01); *C08L 23/22* (2013.01); *C08L 23/283* (2013.01); *C09J 123/16* (2013.01); *C08F 210/16* (2013.01); *C08L 2205/02* (2013.01); *C08L 2205/025* (2013.01); *C08L 2205/03* (2013.01); *C08L 2312/00* (2013.01); *C08L 2314/06* (2013.01); *C09J 2423/16* (2013.01); *C09J 2467/006* (2013.01)

(58) Field of Classification Search

USPC .......................................................... 524/574

See application file for complete search history.

(56) References Cited

FOREIGN PATENT DOCUMENTS

| | | |
|---|---|---|
| WO | 2018/190940 | 10/2018 |
| WO | 2018/227041 | 12/2018 |

PRESSURE SENSITIVE ADHESIVES COMPRISING PROPYLENE-ETHYLENE(-DIENE) COPOLYMERS

CROSS REFERENCE TO RELATED APPLICATIONS

This application is a U.S. national phase application of PCT Application No. PCT/US2020/042619 having a filing date of Jul. 17, 2020, which claims priority to and the benefit of U.S. Provisional Application Ser. No. 62/875,196 having a filing date of Jul. 17, 2019, the contents of both of which are incorporated by reference in their entirety.

FIELD OF INVENTION

The present disclosure relates to pressure-sensitive adhesive (PSA) compositions and articles comprising such PSAs where the PSA comprises a propylene-ethylene(-diene) (PE(D)M) copolymer.

BACKGROUND

Pressure-sensitive adhesives (PSAs) are well known and used in a wide variety of applications, the largest among them being label and tape. Generally, PSAs are adhesive compositions capable of holding materials together by instantaneous low-pressure surface contact. The adhesives require no activation by water, solvent or heat to exert a strong holding force on varied substrates including paper, plastic, wood, cement, and metal. PSAs may be removable, semi-permanent, or permanent.

PSAs are based on elastomeric or thermoplastic polymers together with one or more additives including, for example, (a) a tackifier to enhance tack and wetting properties of the PSA, (b) optionally an oil to plasticize the polymer, and (c) optionally other additives like an antioxidant to reduce degradation of the PSA over time. The properties of PSAs are dependent on factors including, but not limited to, the formulation composition, coating technique, and temperature when in use (e.g., in ambient conditions versus in the freezer). Particularly, the properties may rely on the morphology and structure of polymers. Typical base polymers may include synthetic or natural rubbers, styrenic block copolymers, acrylic block copolymers, silicones, or polyurethanes.

Styrenic block copolymers containing polystyrene and polybutadiene blocks and/or polyisoprene blocks are particularly useful in PSAs. These materials are generally available as pure triblocks, sometimes referred to as SIS and SBS copolymers, and diblocks, sometimes referred to as SI copolymers, SB copolymers, or SIB copolymers. The materials are also available as mixtures of diblock and triblock materials, sometimes referred to as SIS+SI or SIS+SB.

The adhesive properties and viscosity of styrenic block copolymers can be controlled by varying the diblock-to-triblock ratio, varying the styrene content, varying the polymer molecular weight, and/or varying the block molecular weights within the polymers. The melt viscosity can also be controlled by the addition of tackifiers and optionally plasticizers like oils.

SUMMARY OF INVENTION

The present disclosure relates to PSA compositions and articles comprising such PSAs where the PSA comprises a PE(D)M copolymer.

Described herein are pressure-sensitive adhesives including adhesives that comprises: about 18 wt % to about 90 wt % of a propylene-ethylene(-diene) (PE(D)M) copolymer comprising (a) about 60 wt % to about 99 wt % propylene, (b) about 1 wt % to about 40 wt % ethylene or a C4 to C22 alpha-olefin, and (c) 0 wt % to about 20 wt % diene, wherein the PE(D)M copolymer has a heat of fusion of about 15 J/g or less; about 10 wt % to about 65 wt % of a tackifier; and 0 wt % to about 40 wt % of an oil.

Also described herein are methods that comprises: depositing a layer of the foregoing pressure-sensitive adhesive (preferably having a melt flow rate (2.16 kg at 230° C.) of about 5 g/10 min to about 30 g/10 min) that is at about 110° C. to about 250° C. onto a substrate; and cooling the pressure-sensitive adhesive.

Also described herein are methods that comprises: depositing a layer of mixture comprising the foregoing pressure-sensitive adhesive (preferably having a melt flow rate (2.16 kg at 230° C.) of about 10 g/10 min or less) and a solvent onto a substrate; and evaporating the solvent.

BRIEF DESCRIPTION OF THE DRAWINGS

The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION

Figure 1:
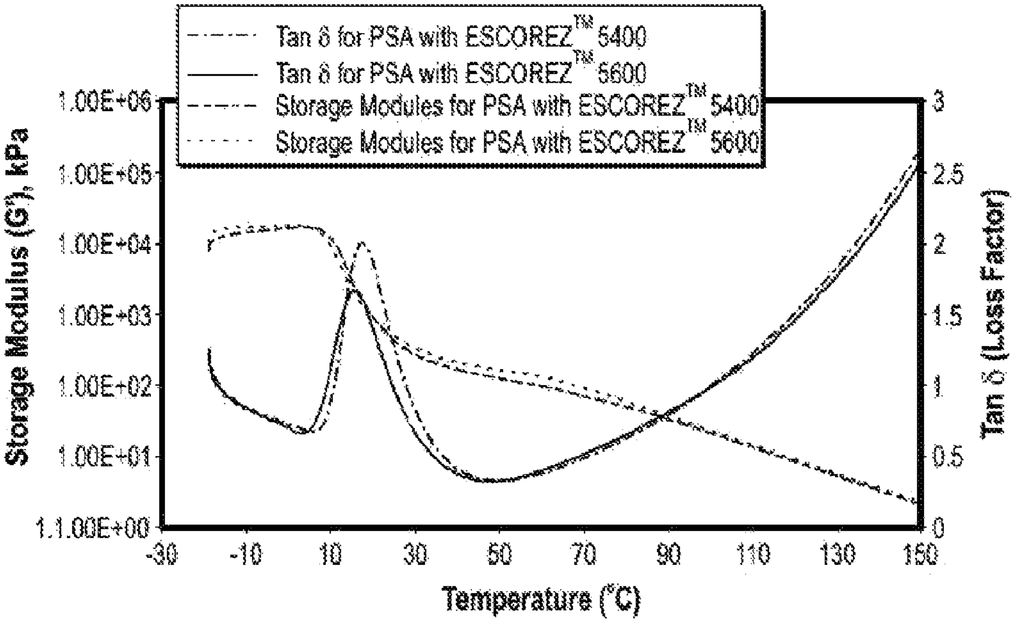
FIG. 1 illustrates the dynamic mechanical analysis (DMA) of PSAs comprising a PEDM copolymer with different tackifiers.

Embodiments described herein include pressure-sensitive adhesives (PSAs) comprising a PE(D)M copolymer. PE(D)M copolymers can be produced by a variety of synthetic methods. The PE(D)M copolymers described herein are produced using synthetic methods (e.g., temperature, catalyst composition, and monomer concentration) so that the PE(D)M copolymers produced are amorphous or have very low crystallinity.

Without being limited by theory, it is believed that the amorphous/low crystallinity nature of the PE(D)M copolymers described herein improves the peel and tack properties of the PSA to a greater extent than would a crystalline or semi-crystalline PE(D)M copolymer. The desired peel and tack properties of PSAs vary widely across the various PSA applications. The amorphous/low crystallinity nature of the PE(D)M copolymers described herein may allow for additional tunability of the properties of the PSAs.

Definitions and Test Methods

As used herein, the term "copolymer" includes polymers having two or more monomers. The term "polymer" as used herein includes, but is not limited to, homopolymers, copolymers, terpolymers, etc., and alloys and blends thereof. The term "terpolymer" as used herein refers to a polymer synthesized from three different monomers. Copolymers, in some embodiments, may be produced (1) by mixing the two or more monomers at the same time or (2) by sequential introduction of the different comonomers. The mixing of comonomers may be done in one, two, or possible three different reactors in series and/or in parallel. The term "polymer" as used herein also includes impact, block, graft, random, and alternating copolymers. The term "polymer" shall further include all possible geometrical configurations unless otherwise specifically stated. Such configurations may include isotactic, syndiotactic and random (i.e., atactic) symmetries.

The term "monomer" or "comonomer," as used herein, can refer to the monomer used to form the polymer (i.e., the unreacted chemical compound in the form prior to polymerization) and can also refer to the monomer after it has been incorporated into the polymer, also referred to herein as a "[monomer]-derived unit". Different monomers are discussed herein, including propylene monomers, ethylene monomers, and diene monomers.

As used herein, when a polymer is referred to as "comprising, consisting of, or consisting essentially of" a monomer or monomer-derived units, the monomer is present in the polymer in the polymerized/derivative form of the monomer. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

As used herein, a "propylene-ethylene(-diene)" (PE(D)M) copolymer refers to copolymers derived from (a) propylene monomers, (b) ethylene monomers or alpha-olefin monomers having 4 or more carbon atoms (e.g., 4-22 carbon atoms), and (c) optionally polyene monomers (preferably non-conjugated diene monomers). The term "PE(D)M copolymer" is used generally to encompass propylene-ethylene (PEM) copolymers (i.e., 0 wt % polyene) and propylene-ethylene-diene (PEDM) copolymers (i.e., greater than 0 wt % polyene).

"Mooney viscosity" as used herein is the Mooney viscosity of a polymer or polymer composition. The polymer composition analyzed for determining Mooney viscosity should be substantially devoid of solvent. For instance, the sample may be placed on a boiling-water steam table in a hood to evaporate a large fraction of the solvent and unreacted monomers, and then, dried in a vacuum oven overnight (12 hours, 90° C.) prior to testing, in accordance with laboratory analysis techniques, or the sample for testing may be taken from a devolatilized polymer (i.e., the polymer post-devolatilization in industrial-scale processes). Unless otherwise indicated, Mooney viscosity is measured using a Mooney viscometer according to ASTM D1646-17, but with the following modifications/clarifications of that procedure. First, sample polymer is pressed between two hot plates of a compression press prior to testing. The plate temperature is 125° C.+/−10° C. instead of the 50+/−5° C. recommended in ASTM D1646-17, because 50° C. is unable to cause sufficient massing. Further, although ASTM D1646-17 allows for several options for die protection, should any two options provide conflicting results, polyethylene terephthalate (PET) 36 micron should be used as the die protection. Further, ASTM D1646-17 does not indicate a sample weight in Section 8; thus, to the extent results may vary based upon sample weight, Mooney viscosity determined using a sample weight of 21.5+/−2.7 g in the D1646-17 Section 8 procedures will govern. Finally, the rest procedures before testing set forth in D1646-17 Section 8 are 23+/−3° C. for 30 min in air; Mooney values as reported herein were determined after resting at 24+/−3° C. for 30 min in air. Samples are placed on either side of a rotor according to the ASTM D1646-17 test method; torque required to turn the viscometer motor at 2 rpm is measured by a transducer for determining the Mooney viscosity. The results are reported as Mooney Units (ML, 1+4 @ 125° C.), where M is the Mooney viscosity number, L denotes large rotor (defined as ML in ASTM D1646-17), 1 is the pre-heat time in minutes, 4 is the sample run time in minutes after the motor starts, and 125° C. is the test temperature. Thus, a Mooney viscosity of 90 determined by the aforementioned method would be reported as a Mooney viscosity of 90 MU (ML, 1+4 @ 125° C.). Alternatively, the Mooney viscosity may be reported as 90 MU; in such instance, it should be assumed that the just-described method is used to determine such viscosity, unless otherwise stated. In some instances, a lower test temperature may be used (i.e., 100° C.), in which case Mooney is reported as Mooney Viscosity (ML, 1+4 @ 100° C.), or @ T° C. where T is the test temperature.

Molecular weights (number average molecular weight (Mn), weight average molecular weight (Mw), and z-average molecular weight (Mz)) were determined by Polymer Char GPC-IR Hyphenated with Multiple Detectors. Unless otherwise indicated, the distributions and the moments of molecular weight (Mw, Mn, Mw/Mn, etc.) are determined by using a high temperature Gel Permeation Chromatography (Polymer Char GPC-IR) equipped with a multiple-channel band-filter based Infrared detector IR5, an 18-angle Wyatt Dawn Heleos light scattering detector and a 4-capillary viscometer with Wheatstone bridge configuration. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system, including transfer lines, columns, and viscometer detector, are contained in ovens maintained at 145° C. The polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 2 hour for the polypropylene samples. The concentration (c), at each point in the chromatogram, is calculated from the baseline-subtracted IR5 broadband signal intensity (I), using the following equation: $c=\beta I$, where $\beta$ is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1}\log M_{PS}$$

where the variables with subscript "PS" stand for polystyrene while those without a subscript are for the test samples. In this method, $\alpha_{PS}$=0.67 and $K_{PS}$=0.000175 while α and K are for other materials as calculated from empirical equations (Sun, T. et al. Macromolecules 2001, 34, 6812). Here the concentrations are expressed in g/cm$^3$, molecular weight is expressed in g/mole, and intrinsic viscosity (hence K in the Mark-Houwink equation) is expressed in dL/g unless otherwise noted.

The LS molecular weight (M) at each point in the chromatogram is determined by analyzing the LS output using the Zimm model for static light scattering $$\frac{K_0 c}{\Delta R(\theta)} = \frac{1}{MP(\theta)} + 2A_2 c.$$

Here, ΔR(θ) is the measured excess Rayleigh scattering intensity at scattering angle θ, c is the polymer concentration determined from the IR5 analysis, $A_2$ is the second virial coefficient, P(θ) is the form factor for a monodisperse random coil, and $K_0$ is the optical constant for the system:

$$K_0 = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=665 nm. For purposes of the present disclosure and the claims thereto (dn/dc)=0.1048 for ethylene-propylene copolymers, and (dn/dc)=0.1048-0.0016ENB for EPDM comprising ENB as the diene, where ENB is the ENB content in wt % in the ethylene-propylene-diene terpolymer. Where other non-conjugated polyenes are used instead of (or in addition to) ENB, the ENB is taken as weight percent of total non-conjugated polyenes.

A high temperature Polymer Char viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer, is calculated from their outputs. The intrinsic viscosity, [η], at each point in the chromatogram, is calculated from the equation $[\eta]=\eta_s/c$, where c is concentration and is determined from the IR5 broadband channel output.

Differential scanning calorimetry (DSC) is used to determine the glass transition temperature ($T_g$) of a polymer according to ASTM D3418-03. Melting temperature ($T_m$) and heat of fusion ($H_f$) are also determined by DSC. DSC data are obtained using a TA Instruments model Q200 machine. Samples weighing approximately 5-10 mg are kept in an aluminum sample pan and hermetically sealed. These are gradually heated to 200° C. at a rate of 10° C./min and thereafter, held at 200° C. for 2 minutes. They are subsequently cooled to −90° C. at a rate of 10° C./minute and held isothermally for 2 minutes at −90° C. This is followed by a second heating cycle wherein the samples are heated to 200° C. at 10° C./min. Both the first and second cycle thermal events are recorded. During the second heating cycle, appearance of melting indicates crystallinity and thus measured heat of fusion is used to compute the crystallinity, unless otherwise indicated. The thermal output, recorded as the area under the melting peak of the sample, is a measure of the heat of fusion and may be expressed in Joules per gram of polymer. The melting point is recorded as the temperature of the greatest heat absorption within the range of melting of the sample relative to a baseline measurement for the increasing heat capacity of the polymer as a function of temperature.

The Tg values reported in the tables are the values recorded during the second heating cycle. For purposes of the claims, Tg values are to be determined by DSC.

The percent crystallinity is calculated using the formula: [area under the curve (in J/g)/H° (in J/g)]*100, where H° is the ideal heat of fusion for a perfect crystal of the homopolymer of the major monomer component. These values for H° are to be obtained from the *Polymer Handbook Fourth Edition*, published by John Wiley and Sons, New York 1999, except that a value of 290 J/g is used for H° (polyethylene), a value of 140 J/g is used for H° (polybutene), and a value of 207 J/g is used for H° (polypropylene).

Dynamic mechanical analysis (DMA) is used to measure the small-strain mechanical response (relaxation behavior) of polymers or adhesive compositions in the solid-state as a function of temperature over a temperature range that included the viscoelastic region prior to melting. Test is performed on an Anton Paar MCR102 using parallel plates to hold the samples during oscillation and temperature ramp. A solid rectangular compression-molded bar is placed on two fixed supports; a movable clamp applied a periodic deformation to the sample midpoint at a frequency of 1 Hz and an amplitude of 20 μm. The bar is initially cooled to −120° C. and then heated to 70° C. at a heating rate of 3° C./min. Typically, only one bar is tested for each neat material or blend. The output of these DMA experiments is the storage modulus (G') and loss modulus (G"). The storage modulus measures the elastic response or the ability of the material to store energy, and the loss modulus measures the viscous response or the ability of the material to dissipate energy. The loss factor is defined as the ratio of G"/G' (=tan δ), indicating the damping ability of the material. Energy dissipation mechanisms (i.e., relaxation modes) show up as peaks in tan δ, and are associated with a drop in G' as a function of temperature. The uncertainty associated with reported values of G' is expected to be on the order of ±10%, due to variability introduced by the compression-molding process.

Melt flow rate (MFR) is measured according to ASTM D1238 test method, at 230° C. and 2.16 kg load, and is expressed as dg/min or g/10 min. Ethylene content is determined using FTIR according the ASTM D3900 and is not corrected for diene content. 5-ethylidene-2-norbornene (ENB) content is determined using FTIR according to ASTM D6047.

Numerical ranges used herein include the numbers recited in the range. For example, the numerical range "1 wt % to 10 wt %" includes 1 wt % and 10 wt % within the recited range.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

Pressure Sensitive Adhesive Compositions

PSAs described herein have the ability at, or at about, room temperature to sufficiently wet a substrate under gentle pressure and to form a useful bond. As used here, the term "useful bond" differs depending on the substrate application and refers to a corresponding balance of adhesive and cohesive strength. The PSAs described herein include a PE(D)M in combination with additional components like tackifiers and/or other additives such as oils or antioxidants. Without being limited by theory, the PE(D)M of the present disclosure preferably has little to no crystallinity, which improves the tack and processability of the adhesive.

PSAs described herein comprise about 18 wt % to about 20 wt % (or about 18 wt % to about 40 wt %, or about 30 wt % to about 60 wt %, or about 50 wt % to about 80 wt %, or about 60 wt % to about 90 wt %) of a PE(D)M copolymer, about 10 wt % to about 65 wt % (or about 10 wt % to about 25 wt %, or about 20 wt % to about 35 wt %, or about 30 wt % to about 45 wt %, or about 40 wt % to about 55 wt %, or about 50 wt % to about 65 wt %) of a tackifier, and about 0 wt % to about 40% of an oil (or 0 wt %, or about 1 wt % to about 15 wt %, or about 5 wt % to about 20 wt %, or about 15 wt % to about 30 wt %, or about 25 wt % to about 40 wt %). Further, the PSAs described herein may comprise other additive.

PE(D)M copolymers described herein have from about 60 wt % to about 99 wt % propylene content, about 1 wt % to about 40 wt % ethylene or $C_4$ to $C_{22}$ α-olefin (preferably ethylene) content, and 0 wt % to about 20 wt % polyene (preferably diene) content, said wt % s based on the weight of the PE(D)M copolymer. Compositions described herein can comprise a single PE(D)M copolymer or a mixture of two or more PE(D)M copolymers.

PE(D)M copolymers described herein may comprise from about 60 wt % to about 99 wt % propylene, based on the weight of the PE(D)M copolymer. Other preferred ranges of propylene content include, but are not limited to, about 60 wt % to about 80 wt %, or about 75 wt % to about 90 wt %, or about 85 wt % to about 95 wt %, or about 90 wt % to about 99 wt %, based on the weight of the PE(D)M copolymer.

PE(D)M copolymers described herein comprise from 1 wt % to 40 wt % ethylene or $C_4$ to $C_{22}$ ($C_4$ to $C_{18}$, or $C_4$ to $C_{14}$, or $C_4$ to $C_{14}$, or $C_4$ to $C_{12}$ $C_4$ to $C_{10}$) alpha-olefin comonomer (preferably ethylene), based on the weight of the PE(D)M copolymer. Other preferred ranges of ethylene or alpha-olefin content include, but are not limited to, from 1 wt % to 10 wt %, or from 2.5 wt % to 15 wt %, or 5 wt % to 25 wt %, or 20 wt % to 40 wt %, or about 1 wt % to about 35 wt %, or about 1 wt % to about 30 wt %, or about 1 wt % to about 25 wt %, based on the weight of the PE(D)M copolymer. Ethylene or $C_4$ to $C_{22}$ alpha-olefin comonomers include, but are not limited to, ethylene, butylene, pentylene, hexylene, heptylene, octylene, nonylene, decylene, undecylene, dodecylene, tridecylene, tetradecylene, pentadecylene, hexadecylene, heptadecylene, octadecylene, nonadecylene, eicosylene, heneicosylene, docosylene, and branched isomers thereof. Ethylene is particularly preferred.

PE(D)M copolymers described herein comprise a polyene content (preferably diene content) of 0 wt % to about 20 wt %, based on the weight of the polymer. Other preferred ranges of polyene content include, but are not limited to, 0 wt % to about 10 wt %, or 0 wt % to about 6 wt %, 0 wt % to about 5 wt %, or 0 wt % to about 3 wt %, or about 0.5 wt % to about 5 wt %, or about 2 wt % to about 3 wt %, or about 3 wt % to about 8 wt %, or about 5 wt % to about 15 wt %, or about 10 wt % to about 20 wt %, based on the weight of the polymers. The polyenes, as noted, are preferably (but not necessarily) dienes. Suitable dienes may be conjugated or non-conjugated. Preferably, the dienes are non-conjugated. Dienes include, but are not limited to, 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD); and the like; and any combination thereof. Preferably, the diene is ENB or VNB.

Wt. % of $C_2$, wt. % of $C_3$-$C_{16}$ olefin and wt. % of diene can be measured by $^{13}C$ NMR and in some cases by $^{1}H$ NMR. Wt. % numbers throughout this document are uncorrected numbers wherein wt. % of $C_2$ plus wt. % of $C_3$-$C_{16}$ olefin equals 100%, unless specifically referred to as being corrected.

For ethylene-propylene and ethylene-propylene-diene copolymers, FTIR is typically used to measure ethylene and diene content (when present), using ASTM D3900 and ASTM D6047. The former provides uncorrected $C_2$ wt. % values.

The corrected wt. % of $C_2$ can be calculated from uncorrected wt. % $C_2$ using the equation below:

$$\text{Corrected wt. \% } C_2 = [\text{uncorrected wt. \% } C_2 \times (100 - \text{wt. \% diene})]/100$$

where the wt. % of ethylene and wt. % of diene are determined by FTIR or by NMR methods.

When the $C_3$-$C_{16}$ olefin is propylene, ASTM D3900 is followed to determine propylene content. When the diene is ENB, ASTM D6047 is followed to determine ENB content. If ASTM established IR methods are not available for other $C_3$-$C_{16}$ olefins, and/or other dienes, $^{13}C$ NMR may be used.

For purposes of the present disclosure, the mole fractions of ethylene, $C_3$-$C_{16}$ olefin, and diene are calculated using the following equations A, B, and C, respectively:

$$C_2 \text{ mole fraction} = \frac{\dfrac{\text{wt \% } C_2}{Mw(C_2)}}{\dfrac{\text{wt. \% } C_2}{Mw(C_2)} + \dfrac{100 - \text{wt. \% } C_2 - \text{wt. \% diene}}{Mw(C_3 - C_{16} \text{ olefin})} + \dfrac{\text{wt. \% diene}}{Mw(\text{diene})}} \quad \text{Equation (A)}$$

$$C_3 - C_{16} \text{ mole fraction} = \frac{\dfrac{100 - \text{wt. \% } C_2 - \text{wt. \% diene}}{Mw(C_3 - C_{16} \text{ olefin})}}{\dfrac{\text{wt. \% } C_2}{Mw(C_2)} + \dfrac{100 - \text{wt. \% } C_2 - \text{wt. \% diene}}{Mw(C_3 - C_{16} \text{ olefin})} + \dfrac{\text{wt. \% diene}}{Mw(\text{diene})}} \quad \text{Equation (B)}$$

Equation (C)

-continued $$\text{Diene mole fraction} = \frac{\frac{\text{wt. \% diene}}{Mw(\text{diene})}}{\frac{\text{wt. \% } C_2}{Mw(C_2)} + \frac{100 - \text{wt. \% } C_2 - \text{wt. \% diene}}{Mw(C_3 - C_{16} \text{ olefin})} + \frac{\text{wt. \% diene}}{Mw(\text{diene})}}$$

where "$Mw(C_2)$" is the molecular weight of ethylene in g/mol, "$Mw(C_3$-$C_{16}$ olefin)" is the molecular weight of the $C_3$-$C_{16}$ olefin in g/mol, "Mw(diene)" is the molecular weight of diene in g/mol, and "wt. % $C_2$" is corrected wt. % of $C_2$.

The tacticity of an α-olefin-ethylene-diene polymer is measured by $^{13}$C NMR. Polypropylene microstructure is determined by $^{13}$C-NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso and "r" to racemic. Polymer resonance peaks are referenced to mmmm=21.8 ppm. Calculations involved in the characterization of polymers by NMR are described by F. A. Bovey in Polymer Conformation and Configuration (Academic Press, New York 1969) and J. Randall in Polymer Sequence Determination, $^{13}$C-NMR Method (Academic Press, New York, 1977).

The "propylene tacticity index", expressed herein as [m/r], is calculated as defined in H. N. Cheng, *Macromolecules,* 17, p. 1950 (1984). When [m/r] is 0 to less than 1.0, the polymer is generally described as syndiotactic, when [m/r] is 1.0 the polymer is atactic, and when [m/r] is greater than 1.0 the polymer is generally described as isotactic. The [m/r] region from 0 to 1.0 is a continuum with polymers having a value closer to zero being more syndiotactic and those having a value closer to one being more atactic like. The phrases "propylene tacticity index", "tacticity index" and "$C_{3+}$olefin tacticity index" are used interchangeably.

For polypropylene, the "mm triad tacticity index" of a polymer is a measure of the relative isotacticity of a sequence of three adjacent propylene units connected in a head-to-tail configuration. More specifically, in the present invention, the mm triad tacticity index (also referred to as the "mm Fraction") of a polypropylene homopolymer or copolymer is expressed as the ratio of the number of units of meso tacticity to all of the propylene triads in the copolymer:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the possible triad configurations for three head-to-tail propylene units, shown below in Fischer projection diagrams:

PPP(mm):

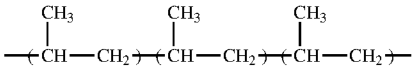

PPP(mr):

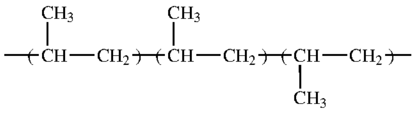

-continued

PPP(rr):

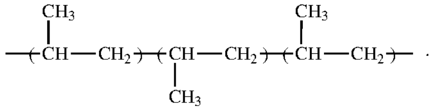

The "rr triad tacticity index" of a polymer is a measure of the relative syndiotacticity of a sequence of three adjacent propylene units connected in a head-to-tail configuration. More specifically, in the present invention, the rr triad tacticity index (also referred to as the "rr Fraction") of a polypropylene homopolymer or copolymer is expressed as the ratio of the number of units of racemic tacticity to all of the propylene triads in the copolymer:

$$rr \text{ Fraction} = \frac{PPP(rr)}{PPP(mm) + PPP(mr) + PPP(rr)}.$$

The calculation of the mm Fraction of a propylene polymer is described in U.S. Pat. No. 5,504,172 (homopolymer: column 25, line 49 to column 27, line 26; copolymer: column 28, line 38 to column 29, line 67). For further information on how the mm triad tacticity can be determined from a $^{13}$C-NMR spectrum, see 1) J. A. Ewen, Catalytic Polymerization of Olefins: Proceedings of the International Symposium on Future Aspects of Olefin Polymerization, T. Keii and K. Soga, Eds. (Elsevier, 1986), pp. 271-292; and 2) U.S. Patent Application Publication No. US2004/054086 (paragraphs [0043] to [0054]).

Similarly m diads and r diads can be calculated as follows where mm, mr and mr are defined above:

$$m = mm + \tfrac{1}{2}mr$$

$$r = rr + \tfrac{1}{2}mr.$$

Preferably, the "propylene tacticity index" [m/r] of an α-olefin-ethylene-diene polymer of the present disclosure is greater than 0.30, alternatively greater than 0.40, alternatively greater than 0.50, and with an upper limit of 1.2, alternatively 1.1, alternatively, 1.0, alternatively 0.9.

Analogous calculations can be done for other $C_{3+}$olefin polymers including those with a low content of ethylene. For further information see J. C. Randall, Polymer Reviews, "A Review of High Resolution liquid $^{13}$C NMR Characterizations of ethylene-based polymers" (1989) 29:2 201-317.

PE(D)M copolymers described herein may have a weight average molecular weight (Mw) of about 5,000,000 g/mol or less, a number average molecular weight (Mn) of about 3,000,000 g/mol or less, and/or a z-average molecular weight (Mz) of about 10,000,000 g/mol or less. Other preferred ranges of Mw include, but are not limited to, about 5,000 g/mol to about 5,000,000 g/mol, or about 5,000 g/mol to about 100,000 g/mol, or about 50,000 g/mol to about 250,000 g/mol, or about 100,000 g/mol to about 1,000,000 g/mol, or about 1,000,000 g/mol to about 5,000,000 g/mol. Other preferred ranges of Mn include, but are not limited to, about 5,000 g/mol to about 3,000,000 g/mol, or about 5,000 g/mol to about 100,000 g/mol, or about 50,000 g/mol to about 250,000 g/mol, or about 100,000 g/mol to about 1,000,000 g/mol, or about 500,000 g/mol to about 3,000,000 g/mol. Other preferred ranges of Mz include, but are not limited to, about 5,000 g/mol to about 10,000,000 g/mol, or about 5,000 g/mol to about 100,000 g/mol, or about 50,000 g/mol to about 250,000 g/mol, or about 100,000 g/mol to about 1,000,000 g/mol, or about 500,000 g/mol to about 5,000,000 g/mol, or about 3,000,000 g/mol to about 10,000,000 g/mol.

The polydispersity (Mw/Mn) of PE(D)M copolymers described herein may be about 1.5 to about 40. Other preferred ranges of polydispersity include, but are not limited to, about 1.5 to 40, or about 1.8 to about 20, or about 2.0 to about 10, or about 2.0 to about 5, or about 3 to about 4.5.

PE(D)M copolymers described herein may have a melt flow rate (MFR, 2.16 kg weight at 230° C.) of at least 0.1 g/10 min as measured according to the ASTM D1238-13. Other preferred ranges of the MFR (2.16 kg at 230° C.) include, but are not limited to, about 0.1 g/10 min to about 50 g/10 min, or about 0.1 g/10 min to about 10 g/10 min, or about 1 g/10 min to about 15 g/10 min, about 5 g/10 min to about 45 g/10 min, or about 30 g/10 min to about 300 g/10 min, or about 300 g/10 min to about 1000 g/10 min.

Whilst not limiting the embodiments herein, PE(D)M copolymers having a lower MFR (e.g., 10 g/10 min or less, preferably 5 g/10 min or less, more preferably 3 g/10 min or less) may be used in solvent-based adhesives. By way of nonlimiting example, a solvent-based adhesive may comprise a mixture comprising a pressure-sensitive adhesive and a solvent, wherein the pressure-sensitive adhesive comprises: about 18 wt % to about 90 wt % of a PE(D)M copolymer comprising (a) about 60 wt % to about 99 wt % propylene, (b) about 1 wt % to about 40 wt % ethylene or a C4 to C22 alpha-olefin, and (c) 0 wt % to about 20 wt % diene, wherein the PE(D)M copolymer has MFR (2.16 kg at 230° C.) of about 0.1 g/10 min to about 10 g/10 min (or about 0.1 g/10 min to about 5 g/10 min, or about 0.1 g/10 min to about 3 g/10 min); about 10 wt % to about 65 wt % of a tackifier; 0 wt % to about 40 wt % of an oil; and optionally other additives like fillers.

However, depending on the tackifier composition and other components like oils, higher MFR PE(D)M copolymers may be used in adhesives that do not comprise a solvent. For example, hot melt adhesives described herein may comprise PE(D)M copolymers having a MFR of 5 g/10 min or greater (e.g., 10 g/10 min or greater). By way of nonlimiting example, a pressure-sensitive adhesive may comprise: about 18 wt % to about 90 wt % of a PE(D)M copolymer comprising (a) about 60 wt % to about 99 wt % propylene, (b) about 1 wt % to about 40 wt % ethylene or a C4 to C22 alpha-olefin, and (c) 0 wt % to about 20 wt % diene, wherein the PE(D)M copolymer has MFR (2.16 kg at 230° C.) of about 5 g/10 min to about 50 g/10 min (or about 5 g/10 min to about 30 g/10 min, or about 10 g/10 min to about 25 g/10 min); about 10 wt % to about 65 wt % of a tackifier; 0 wt % to about 40 wt % of an oil; and optionally other additives like fillers.

PE(D)M copolymers described herein may have a Mooney viscosity (ML, 1+4 @125° C.) of about 5 MU to about 100 MU. Other preferred ranges of Mooney viscosity (ML, 1+4 @ 125° C.) include, but are not limited to, about 5 MU to about 25 MU, or about 10 MU to about 50 MU, or about 40 MU to about 75 MU, or about 60 MU to about 100 MU.

PE(D)M copolymers described herein are preferably amorphous or have low crystallinity. A PE(D)M copolymer is amorphous if the PE(D)M copolymer exhibits no melting peak when subjected to DSC testing and/or the PE(D)M copolymer has $H_f$<1 J/g according to the DSC methodology described herein. Further, where a PE(D)M exhibits any melting peak, such peak may be a single peak, or the PE(D)M may show secondary melting peaks adjacent to the principal peak. For purposes herein, such secondary melting peaks are considered together as a single melting point, with the highest of these peaks (relative to baseline as described herein) being considered as the melting point of the PE(D)M copolymers.

PE(D)M copolymers described herein may have a $H_f$, as determined by the DSC procedure described herein, of about 15 J/g or less. Other preferred ranges of the $H_f$ include, but are not limited to, 0 J/g to about 15 J/g, or 0 J/g to about 10 J/g, or 0 J/g to about 8 J/g, or 0 J/g to about 5 J/g, or 0 J/g to about 3 J/g, or 0 J/g to about 1 J/g.

PE(D)M copolymers described herein may have a $H_f$, as measured from the first heating cycle after aging at room temperature for at least 1 hour, or 1 day, or 1 week, or 4 weeks by the DSC procedure described herein, of about 15 J/g or less. Other preferred ranges of the $H_f$ include, but are not limited to, 0 J/g to about 15 J/g, or 0 J/g to about 10 J/g, or 0 J/g to about 8 J/g, or 0 J/g to about 5 J/g, or 0 J/g to about 3 J/g, or 0 J/g to about 1 J/g.

PE(D)M copolymers described herein may have a $T_g$, as determined by the DSC procedure described herein, of about −50° C. to about −15° C. Other preferred ranges of the $T_g$ include, but are not limited to, about −50° C. to about −25° C., or about −30° C. to about −15° C.

The PE(D)M copolymer has a polymer Tg (° C.) greater than or equal to −7.886−(87.98*E)+(294*D) and less than or equal to −0.886−(87.98*E)+(294*D) wherein E is the mole fraction of ethylene in the polymer and D is the mole fraction of diene in the polymer.

DMA analysis can be used to determine the storage modulus (G') and loss modulus (G") of PE(D)M copolymers. The modulus values change with temperature and transitions in polymers can be seen as changes in the G' or tan δ (ratio of G"/G'). A (nearly) constant modulus in the region above the $T_g$ and below the $T_m$ is often observed which is known as the plateau modulus, which is the result of entanglements.

The PEDM terpolymers may be made by a polymerization process including contacting propylene, a C2, C4-12 α-olefin (such as ethylene), and diene (such as ENB) with a catalyst system comprising an activator, optional support, and a catalyst compound. The catalyst compound, optional support and activator may be combined in any order, and are combined typically prior to contacting the catalyst system with the monomers.

Polymerization processes of the present disclosure can be carried out in any suitable manner, such as any suitable suspension, homogeneous, bulk, solution, slurry, or gas phase polymerization process. Such processes can be run in a batch, semi-batch, or continuous mode. Gas phase polymerization processes and slurry processes are preferred. Additional description of processes for making the PEDM terpolymers is described in PCT/US2019/022738, filed Mar. 18, 2019, and PCT/US2019/022764, filed on Mar. 18, 2019, both of which are incorporated herein by reference in their entirety.

The present disclosure provides polymerization processes where propylene, $C_2$, C4-C12 olefin (such as ethylene), and diene (such as ENB) are contacted with a catalyst system comprising an activator, optional support, and a catalyst compound. The catalyst compound, optional support and activator may be combined in any order, and are combined typically prior to contacting the catalyst system with the monomer. In at least one embodiment, the catalyst compound is represented by formula (I):

$$T_yCp'_mMG_nX_q \quad (I)$$

wherein:

Cp' is a tetrahydroindacenyl group (such as tetrahydro-s-indacenyl or tetrahydro-as-indacenyl) which is optionally substituted or unsubstituted, provided that when Cp' is tetrahydro-s-indacenyl: 1) the 3 and/or 4 positions are not aryl or substituted aryl, 2) the 3 position is not directly bonded to a group 15 or 16 heteroatom, 3) there are no additional rings fused to the tetrahydroindacenyl ligand, 4) T is not bonded to the 2-position, and 5) the 5, 6, or 7-position (preferably the 6 position) is geminally disubstituted, preferably with two $C_1$-$C_{10}$ alkyl groups;

M is a group 2, 3, 4, 5, or 6 transition metal, preferably group 4 transition metal, for example titanium, zirconium, or hafnium (preferably titanium);

T is a bridging group (such as dialkylsilylene, dialkylcarbylene, phen-1,2-diyl, substituted phen-1,2-diyl, cyclohex-1,2-diyl or substituted cyclohex-1,2-diyl). T is preferably $(CR^8R^9)_x$, $SiR^8R^9$ or $GeR^8R^9$ where x is 1 or 2, $R^8$ and $R^9$ are independently selected from hydrogen, substituted or unsubstituted hydrocarbyl, halocarbyl, silylcarbyl and germylcarbyl and $R^8$ and $R^9$ may optionally be bonded together to form a ring structure, and in a particular embodiment, $R^8$ and $R^9$ are not aryl);

y is 0 or 1, indicating the absence or presence of T;

G is a heteroatom group represented by the formula $JR^i_{z-y}$ where J is N, P, O or S, $R^1$ is a $C_1$ to $C_{100}$ hydrocarbyl group (such as a $C_1$ to $C_{20}$ hydrocarbyl group), and z is 2 when J is N or P, and z is 1 when J is O or S (preferably J is N and z is 2) ($R^i$ can be a linear, branched or cyclic $C_1$ to $C_{20}$ hydrocarbyl group, preferably independently selected from methyl, ethyl, propyl, butyl, pentyl, hexyl, heptyl, octyl, nonyl, decyl, phenyl, and isomers thereof, including t-butyl, cyclododecyl, cyclooctyl, preferably t-butyl and or cyclododecyl); X is a leaving group (such as a halide, a hydride, an alkyl group, an alkenyl group or an arylalkyl group) and optionally two or more X may form a part of a fused ring or a ring system;

m=1; n=1, 2 or 3; q=1, 2 or 3; and the sum of m+n+q is equal to the oxidation state of the transition metal (preferably 3, 4, 5, or 6, preferably 4); preferably m=1, n=1, q is 2, and y=1.

In at least one embodiment of formula (I), M is a group 4 transition metal (preferably Hf, Ti and/or Zr, preferably Ti). In at least one embodiment of formula (I), $JR^i_{z-y}$ is cyclododecyl amido, t-butyl amido, and or 1-adamantyl amido.

In at least one embodiment of formula (I), each X is, independently, selected from hydrocarbyl radicals having from 1 to 20 carbon atoms, aryls, hydrides, amides, alkoxides, sulfides, phosphides, halides, dienes, amines, phosphines, ethers, and a combination thereof, (two X's may form a part of a fused ring or a ring system), preferably each X is independently selected from halides, aryls and $C_1$ to $C_5$ alkyl groups, preferably each X is a benzyl, methyl, ethyl, propyl, butyl, pentyl, or chloro group.

In at least one embodiment of formula (I), the Cp' group may be substituted with a combination of substituent groups R. R includes one or more of hydrogen, or linear, branched alkyl radicals, or alkenyl radicals, alkynyl radicals, cycloalkyl radicals or aryl radicals, acyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, arylamino radicals, straight, branched or cyclic, alkylene radicals, or combination thereof. In at least one embodiment, substituent groups R have up to 50 non-hydrogen atoms, preferably from 1 to 30 carbon, that can also be substituted with halogens or heteroatoms or the like, provided that when Cp' is tetrahydro-s-indacenyl: 1) the 3 and/or 4 position is not aryl or substituted aryl, 2) the 3-position is not substituted with a group 15 or 16 heteroatom, 3) there are no additional rings fused to the tetrahydroindacenyl ligand, T is not bonded to the 2-position, and 5) the 5, 6, or 7-position (preferably the 6 position) is geminally disubstituted, preferably with two $C_1$-$C_{10}$ alkyl groups. Non-limiting examples of alkyl substituents R include methyl, ethyl, propyl, butyl, pentyl, hexyl, cyclopentyl, cyclohexyl, benzyl or phenyl groups and the like, including all their isomers, for example, tertiary butyl, isopropyl and the like. Other hydrocarbyl radicals include fluoromethyl, fluoroethyl, difluoroethyl, iodopropyl, bromohexyl chlorobenzyl and hydrocarbyl substituted organometalloid radicals including trimethylsilyl, trimethylgermyl, methyldiethylsilyl and the like; and halocarbyl-substituted organometalloid radicals including tris (trifluoromethyl)silyl, methylbis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorus, oxygen, tin, sulfur, germanium and the like, including olefins such as, but not limited to, olefinically unsaturated substituents including vinyl-terminated ligands, for example but-3-enyl, prop-2-enyl, hex-5-enyl and the like.

In at least one embodiment of formula (I), the substituent (s) R are, independently, hydrocarbyl groups, heteroatoms, or heteroatom containing groups, such as methyl, ethyl, propyl, butyl, pentyl, hexyl, heptyl, octyl, nonyl, decyl, undecyl, dodecyl or an isomer thereof, or a $C_1$ to $C_{20}$ hydrocarbyl substituted with an N, O, S and or P heteroatom or heteroatom containing group (typically having up to 12 atoms, including the N, O, S and P heteroatoms), provided that when Cp' is tetrahydro-s-indacenyl, the 3 and/or 4 position are not aryl or substituted aryl, the 3 position is not substituted with a group 15 or 16 heteroatom, and there are no additional rings fused to the tetrahydroindacenyl ligand, T is not bonded to the 2-position, and the 5, 6, or 7-position (preferably the 6 position) is geminally disubstituted, preferably with two $C_1$-$C_{10}$ alkyl groups.

In at least one embodiment of formula (I), the Cp' group is tetrahydro-as-indacenyl or tetrahydro-s-indacenyl which may be substituted.

y can be 1 where T is a bridging group containing at least one group 13, 14, 15, or 16 element, in particular boron or a group 14, 15 or 16 element. Examples of suitable bridging groups include P(=S)R*, P(=Se)R*, P(=O)R*, $R^*_2C$, $R^*_2Si$, $R^*_2Ge$, $R^*_2CCR^*_2$, $R^*_2CCR^*_2CR^*_2$, $R^*_2CCR^*_2CR^*_2CR^*_2$, R*C=CR*, $R^*C{=}CR^*CR^*_2$, $R^*_2CCR^*{=}CR^*CR^*_2$, R*C=CR*CR*=CR*, $R^*C{=}CR^*CR^*_2CR^*_2$, $R^*_2CSiR^*_2$, $R^*_2SiSiR^*_2$, $R^*_2SiOSiR^*_2$, $R^*_2CSiR^*_2CR^*_2$, $R^*_2SiCR^*_2SiR^*_2$, $R^*C{=}CR^*SiR^*_2$, $R^*_2CGeR^*_2$, $R^*_2GeGeR^*_2$, $R^*_2CGeR^*_2CR^*_2$, $R^*_2GeCR^*_2GeR^*_2$, $R^*_2SiGeR^*_2$, $R^*C{=}CR^*GeR^*_2$, R*B, $R^*_2C{-}BR^*$, $R^*_2C{-}BR^*{-}CR^*_2$, $R^*_2C{-}O{-}CR^*_2$, $R^*_2CR^*_2C{-}O{-}CR^*_2CR^*_2$, $R^*_2C{-}O{-}CR^*_2CR^*_2$, $R^*_2C{-}O{-}CR^*{=}CR^*$, $R^*_2C{-}S{-}CR^*_2$, $R^*_2CR^*_2C{-}S{-}CR^*_2CR^*_2$, $R^*_2C{-}S{-}CR^*_2CR^*_2$, $R^*_2C{-}S{-}CR^*{=}CR^*$, $R^*_2C{-}Se{-}CR^*_2$, $R^*_2CR^*_2C{-}Se{-}CR^*_2CR^*_2$, $R^*_2C{-}Se{-}CR^*_2CR^*_2$, $R^*_2C{-}Se{-}CR^*{=}CR^*$, $R^*_2C{-}N{=}CR^*$, $R^*_2C{-}NR^*{-}CR^*_2$, $R^*_2C{-}NR^*{-}CR^*_2CR^*_2$, $R^*_2C{-}NR^*{-}$ $CR^*{=}CR^*$, $R^*_2CR^*_2C{-}NR^*{-}CR^*_2CR^*_2$, $R^*_2C{-}P{=}CR^*$, $R^*_2C{-}PR^*{-}CR^*_2$, O, S, Se, Te, $NR^*$, $PR^*$, $AsR^*$, $SbR^*$, O—O, S—S, $R^*N{-}NR^*$, $R^*P{-}PR^*$, O—S, O—$NR^*$, O—$PR^*$, S—$NR^*$, S—$PR^*$, and $R^*N{-}PR^*$ where $R^*$ is hydrogen or a $C_1$-$C_{20}$ containing hydrocarbyl, substituted hydrocarbyl, halocarbyl, substituted halocarbyl, silylcarbyl or germylcarbyl substituent, and optionally two or more adjacent $R^*$ may join to form a substituted or unsubstituted, saturated, partially unsaturated or aromatic, cyclic or polycyclic substituent, and optionally any one or more adjacent $R^*$ and $R^i$ may join to form a substituted or unsubstituted, saturated, partially unsaturated or aromatic, cyclic or polycyclic substituent. Preferred examples for the bridging group T include —$CH_2$—, —$CH_2CH_2$—, —$SiMe_2$-, —$SiPh_2$-, —Si(Me)(Ph)-, —$Si(CH_2)_3$—, —$Si(CH_2)_4$—, —O—, —S—, —N(Ph)-, —P(Ph)-, —N(Me)-, —P(Me)-, —N(Et)-, —N(Pr)—, —N(Bu)-, —P(Et)-, —P(Pr)—, -$(Me)_2SiOSi(Me)_2$-, and —P(Bu)-. In a preferred embodiment of the present disclosure, when Cp' is tetrahydro-s-indacenyl and T is $R^*_2Si$, then $R^*$ is not aryl. In some embodiments, $R^*$ is not aryl or substituted aryl.

In at least one embodiment, the catalyst compound is one or more bridged transition metal compounds represented by formula (II):

(II)

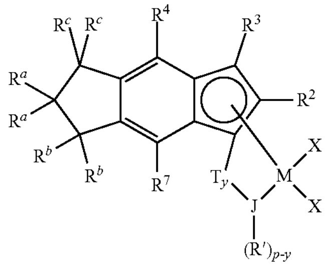

where M is a group 4 metal (such as Hf, Ti or Zr, preferably Ti);

J is N, O, S or P;

p is 2 when J is N or P, and is 1 when J is O or S (preferably J is N, y=1, and p=2);

each $R^a$ is independently $C_1$-$C_{10}$ alkyl (alternately a $C_2$-$C_{10}$ alkyl);

each $R^b$ and each $R^c$ is independently hydrogen or a $C_1$-$C_{10}$ alkyl (alternately a $C_2$-$C_{10}$ alkyl);

each $R^2$, $R^3$, $R^4$, and $R^7$ is independently hydrogen, or a $C_1$-$C_{50}$ substituted or unsubstituted hydrocarbyl, halocarbyl, silylcarbyl or germylcarbyl, provided that: 1) $R^3$ and/or $R^4$ are not aryl or substituted aryl, 2) $R^3$ is not directly bonded to a group 15 or 16 heteroatom, and 3) adjacent $R^4$, $R^c$, $R^a$, $R^b$, or $R^7$ do not join together to form a fused ring system;

each R' is, independently, a $C_1$-$C_{100}$ substituted or unsubstituted hydrocarbyl, halocarbyl, silylcarbyl or germylcarbyl;

T is a bridging group and y is 0 or 1 indicating the absence (y=0) or presence (y=1) of T;

and each X is, independently, a leaving group, or two Xs are joined and bound to the metal atom to form a metallocycle ring, or two Xs are joined to form a chelating ligand, a diene ligand, or an alkylidene.

In at least one embodiment, the catalyst compound is one or more bridged transition metal compounds represented by formula (III):

(III)

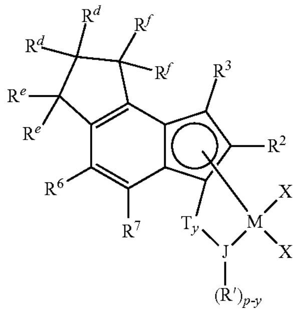

where M is a group 4 metal (such as Hf, Ti or Zr, preferably Ti);

J is N, O, S or P;

p is 2 when J is N or P, and is 1 when J is O or S (preferably J is N, y=1, and p=2);

each $R^d$, $R^c$ and $R^f$ are independently hydrogen or a $C_1$-$C_{10}$ alkyl (alternately a $C_2$-$C_{10}$ alkyl);

each $R^2$, $R^3$, $R^6$, and $R^7$ is independently hydrogen, or a $C_1$-$C_{50}$ substituted or unsubstituted hydrocarbyl, halocarbyl, silylcarbyl or germylcarbyl;

each R' is, independently, a $C_1$-$C_{100}$ substituted or unsubstituted hydrocarbyl, halocarbyl, silylcarbyl or germylcarbyl;

T is a bridging group and y is 0 or 1 indicating the absence (y=0) or presence (y=1) of T;

and each X is, independently, a leaving group, or two Xs are joined and bound to the metal atom to form a metallocycle ring, or two Xs are joined to form a chelating ligand, a diene ligand, or an alkylidene.

In some embodiments of formulae II and III, y is 1 and T is $(CR^8R^9)_x$, $SiR^8R^9$ or $GeR^8R^9$ where x is 1 or 2, $R^8$ and $R^9$ are independently selected from hydrogen or substituted or unsubstituted hydrocarbyl, halocarbyl, silylcarbyl and germylcarbyl and $R^8$ and $R^9$ may optionally be bonded together to form a ring structure.

In at least one embodiment of the present disclosure, each $R^2$, $R^3$, $R^6$, and $R^7$ is independently hydrogen, or a $C_1$-$C_{50}$ substituted or unsubstituted hydrocarbyl, halocarbyl, silylcarbyl or germylcarbyl, preferably methyl, ethyl, propyl, butyl, pentyl, hexyl, heptyl, octyl, nonyl, decyl, undecyl, and dodecyl or an isomer thereof.

In at least one embodiment of the present disclosure, each $R^2$, $R^3$, $R^4$, and $R^7$ is independently hydrogen, or a $C_1$-$C_{50}$ substituted or unsubstituted hydrocarbyl, halocarbyl, silylcarbyl or germylcarbyl, preferably methyl, ethyl, propyl, butyl, pentyl, hexyl, heptyl, octyl, nonyl, decyl, undecyl, and dodecyl or an isomer thereof.

In at least one embodiment of the present disclosure, each $R^a$ or $R^d$ is independently selected from methyl, ethyl, propyl, butyl, pentyl, hexyl, heptyl, octyl, nonyl, decyl, and isomers thereof, preferably methyl and ethyl, preferably methyl.

In at least one embodiment of the present disclosure, each $R^b$, $R^c$, $R^e$ or $R^f$ is independently selected from hydrogen, methyl, ethyl, propyl, butyl, pentyl, hexyl, heptyl, octyl, nonyl, decyl, and isomers thereof, preferably hydrogen or methyl, preferably hydrogen.

In at least one embodiment of the present disclosure, each $R^a$ is independently selected from methyl, ethyl, propyl, butyl, pentyl, hexyl, heptyl, octyl, nonyl, decyl, and isomers thereof, preferably methyl and ethyl, preferably methyl, and each $R^b$ and $R^c$ are independently selected from hydrogen, methyl, ethyl, propyl, butyl, pentyl, hexyl, heptyl, octyl, nonyl, decyl, and isomers thereof, preferably hydrogen or methyl, preferably hydrogen.

In at least one embodiment of the present disclosure, each $R^d$ is independently selected from hydrogen, methyl, ethyl, propyl, butyl, pentyl, hexyl, heptyl, octyl, nonyl, decyl, and isomers thereof, preferably methyl and ethyl, preferably methyl, and each $R^e$ and $R^f$ are independently selected from hydrogen, methyl, ethyl, propyl, butyl, pentyl, hexyl, heptyl, octyl, nonyl, decyl, and isomers thereof, preferably hydrogen or methyl, preferably hydrogen.

In at least one embodiment of the present disclosure, each $R^a$, $R^b$ and $R^c$ are independently selected from hydrogen, methyl, ethyl, propyl, butyl, pentyl, hexyl, heptyl, octyl, nonyl, decyl, and isomers thereof, preferably hydrogen or methyl.

In at least one embodiment of the present disclosure, each $R^d$, $R^e$ and $R^f$ are independently selected from hydrogen, methyl, ethyl, propyl, butyl, pentyl, hexyl, heptyl, octyl, nonyl, decyl, and isomers thereof, preferably hydrogen or methyl.

In at least one embodiment of the present disclosure, R' is a $C_1$-$C_{100}$ substituted or unsubstituted hydrocarbyl, halocarbyl, or silylcarbyl, preferably methyl, ethyl, propyl, butyl, pentyl, hexyl, heptyl, octyl, nonyl, decyl, undecyl, dodecyl, phenyl or an isomer thereof, preferably t-butyl, neopentyl, cyclohexyl, cyclooctyl, cyclododecyl, adamantyl, or norbornyl.

In at least one embodiment of the present disclosure, T is $CR^8R^9$, $R^8R^9C$—$CR^8R^9$, $SiR^8R^9$ or $GeR^8R^9$ where $R^8$ and $R^9$ are independently selected from hydrogen or substituted or unsubstituted hydrocarbyl, halocarbyl, silylcarbyl and $R^8$ and $R^9$ may optionally be bonded together to form a ring structure, preferably each $R^8$ and $R^9$ is independently methyl, ethyl, propyl, butyl, pentyl, hexyl, heptyl, octyl, nonyl, decyl, benzyl, phenyl, methylphenyl or an isomer thereof, preferably methyl, ethyl, propyl, butyl, or hexyl. When $R^8$ and $R^9$ are optionally bonded together preferred bridges include substituted or unsubstituted phen-1,2-diyl, cyclohex-1,2-diyl, cyclopentamethylenesilylene, cyclotetramethylenesilylene, cyclotrimethylenesilylene and dibenzo[b,d]silolyl. Additionally, optionally any one or more adjacent $R^8$ and/or $R^9$ may join to form a substituted or unsubstituted, saturated, partially unsaturated or aromatic, cyclic or polycyclic substituent along with R'.

In at least one embodiment of the present disclosure, at least one of $R^8$ or $R^9$ is not aryl. In at least one embodiment of the present disclosure, $R^8$ is not aryl. In at least one embodiment of the present disclosure, $R^9$ is not aryl. In at least one embodiment of the present disclosure, $R^8$ and $R^9$ are not aryl.

In at least one embodiment of the present disclosure, $R^8$ and $R^9$ are independently $C_1$-$C_{10}$ alkyl, such as methyl, ethyl, propyl, butyl, pentyl, hexyl, heptyl, octyl, nonyl, decyl, or an isomer thereof.

In at least one embodiment of the present disclosure, each $R^2$, $R^3$, $R^4$, and $R^7$ is independently hydrogen or hydrocarbyl. Each $R^2$, $R^3$, $R^4$, and $R^7$ can be independently hydrogen or a $C_1$-$C_{10}$ alkyl, such as methyl, ethyl, propyl, butyl, pentyl, hexyl, heptyl, octyl, nonyl, decyl, or an isomer thereof.

In at least one embodiment of the present disclosure, each $R^2$, $R^3$, $R^6$, and $R^7$ is independently hydrogen or hydrocarbyl. Each $R^2$, $R^3$, $R^6$, and $R^7$ can be independently hydrogen or a $C_1$-$C_{10}$ alkyl, preferably methyl, ethyl, propyl, butyl, pentyl, hexyl, heptyl, octyl, nonyl, decyl, or an isomer thereof.

In at least one embodiment of the present disclosure, $R^2$ is a $C_1$-$C_{10}$ alkyl and $R^3$, $R^4$, and $R^7$ are hydrogen.

In at least one embodiment of the present disclosure, $R^2$ is a $C_1$-$C_{10}$ alkyl and $R^3$, $R^6$, and $R^7$ are hydrogen.

In at least one embodiment of the present disclosure, $R^2$, $R^3$, $R^4$, and $R^7$ are hydrogen. In at least one embodiment of the present disclosure, $R^2$, $R^3$, $R^6$, and $R^7$ are hydrogen.

In at least one embodiment of the present disclosure, $R^2$ is methyl, ethyl, or an isomer of propyl, butyl, pentyl or hexyl, and $R^3$, $R^4$, and $R^7$ are hydrogen. In at least one embodiment of the present disclosure, $R^2$ is methyl, ethyl, or an isomer of propyl, butyl, pentyl or hexyl, and $R^3$, $R^6$, and $R^7$ are hydrogen.

In at least one embodiment of the present disclosure, $R^2$ is methyl and $R^3$, $R^4$, and $R^7$ are hydrogen. In at least one embodiment of the present disclosure, $R^2$ is methyl and $R^3$, $R^6$, and $R^7$ are hydrogen.

In at least one embodiment of the present disclosure, $R^3$ is hydrogen. In at least one embodiment of the present disclosure, $R^2$ is hydrogen.

In at least one embodiment of the present disclosure, $R^2$ and each $R^a$ is independently a $C_1$-$C_{10}$ alkyl and $R^3$, $R^4$, $R^7$ and each $R^b$ and $R^c$ are hydrogen.

In at least one embodiment of the present disclosure, $R^2$ and each $R^d$ is a $C_1$-$C_{10}$ alkyl and $R^3$, $R^6$, $R^7$ and each $R^e$ and $R^f$ are hydrogen.

In at least one embodiment of the present disclosure, $R^2$ and each $R^a$ is independently a methyl, ethyl, propyl, butyl, pentyl, hexyl, heptyl, octyl, nonyl, decyl, or an isomer thereof, and $R^3$, $R^4$, $R^7$ and each $R^b$ and $R^c$ are hydrogen.

In at least one embodiment of the present disclosure, $R^2$ and each $R^d$ is a methyl, ethyl, propyl, butyl, pentyl, hexyl, heptyl, octyl, nonyl, decyl, or an isomer thereof, and $R^3$, $R^6$, $R^7$ and each $R^e$ and $R^f$ are hydrogen.

In at least one embodiment of the present disclosure, R' is $C_1$-$C_{100}$ or $C_1$-$C_{30}$ substituted or unsubstituted hydrocarbyl.

In at least one embodiment of the present disclosure, R' is $C_1$-$C_{30}$ substituted or unsubstituted alkyl (linear, branched, or cyclic), aryl, alkaryl, or heterocyclic group. In at least one embodiment of the present disclosure, R' is $C_1$-$C_{30}$ linear, branched or cyclic alkyl group.

In at least one embodiment of the present disclosure, R' is methyl, ethyl, or any isomer of propyl, butyl, pentyl, hexyl, heptyl, octyl, nonyl, decyl, undecyl, or dodecyl. In at least one embodiment of the present disclosure, R' is a cyclic or polycyclic hydrocarbyl.

In at least one embodiment of the present disclosure, R' is selected from tert-butyl, neopentyl, cyclohexyl, cycloheptyl, cyclooctyl, cyclononyl, cyclodecyl, cycloundecyl, cyclododecyl, adamantyl, and norbornyl. In at least one embodiment, R' is tert-butyl.

In at least one embodiment of the present disclosure, $R^i$ is selected from tert-butyl, neopentyl, cyclohexyl, cycloheptyl, cyclooctyl, cyclononyl, cyclodecyl, cycloundecyl, cyclododecyl, adamantyl, and norbornyl. In at least one embodiment, $R^i$ is tert-butyl.

In at least one embodiment of the present disclosure, T is selected from diphenylmethylene, dimethylmethylene, 1,2-ethylene, phen-1,2-diyl, cyclohex-1,2-diyl cyclotrimethylenesilylene, cyclotetramethylenesilylene, cyclopentamethylenesilylene, dibenzo[b,d]silolyl, dimethylsilylene, diethylsilylene, methylethylsilylene, and dipropylsilylene.

In at least one embodiment of the present disclosure, each $R^a$ is independently methyl, ethyl, propyl, butyl, pentyl or hexyl. In at least one embodiment of the present disclosure, each $R^a$ is independently methyl or ethyl. Each $R^a$ can be methyl.

In at least one embodiment of the present disclosure, each $R^d$ is independently methyl, ethyl, propyl, butyl, pentyl or hexyl. In at least one embodiment of the present disclosure, each $R^d$ is independently methyl or ethyl. Each $R^d$ can be methyl.

In at least one embodiment of the present disclosure, each $R^d$ and each $R^e$ and $R^f$ are independently hydrogen, methyl, ethyl, propyl, butyl, pentyl or hexyl. In at least one embodiment of the present disclosure, each $R^d$ is independently hydrogen, methyl, or ethyl.

In at least one embodiment of the present disclosure, each $R^b$ and $R^c$ is hydrogen. In at least one embodiment of the present disclosure, each $R^e$ and $R^f$ is hydrogen.

In at least one embodiment of the present disclosure, each X is hydrocarbyl, halocarbyl, or substituted hydrocarbyl or halocarbyl.

In at least one embodiment of the present disclosure, X is methyl, benzyl, or halo where halo includes fluoro, chloro, bromo and iodido.

In at least one embodiment of the present disclose, both X are joined together to form a $C_4$-$C_{20}$ diene ligand such as 1,3-butadiene, 1,3-pentadiene, 2-methyl-1,3-pentadiene, 2,4-dimethylpentadiene and the like.

In at least one embodiment of formula (II) of the present disclosure: 1) $R^3$ and/or $R^4$ are not aryl or substituted aryl, 2) $R^3$ is not directly bonded to a group 15 or 16 heteroatom, and 3) adjacent $R^4$, $R^c$, $R^a$, $R^b$, or $R^7$ do not join together to form a fused ring system, and 4) each $R^a$ is a $C_1$ to $C_{10}$ alkyl (preferably methyl, ethyl, propyl, butyl, pentyl, hexyl, heptyl, octyl, nonyl, decyl, or an isomer thereof).

In a preferred embodiment of the present disclosure, T of any of formulas (I)-(III) is represented by the formula $ER^g_2$ or $(ER^g_2)_2$, where E is C, Si, or Ge, and each $R^g$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two $R^g$ can form a cyclic structure including aromatic, partially saturated, or saturated cyclic or fused ring system. Preferably, T is a bridging group comprising carbon or silica, such as dialkylsilyl, preferably T is selected from $—CH_2—$, $—CH_2CH_2—$, $—C(CH_3)_2—$, $Si(Me)_2$, cyclotrimethylenesilylene ($—Si(CH_2)_3—$), cyclopentamethylenesilylene ($—Si(CH_2)_5—$) and cyclotetramethylenesilylene ($—Si(CH_2)_4—$).

In at least one embodiment, a catalyst compound is one or more of:

dimethylsilylene(2,6,6-trimethyl-1,5,6,7-tetrahydro-s-indacen-1-yl)(t-butylamido)$M(R)_2$;
dimethylsilylene(6,6-dimethyl-1,5,6,7-tetrahydro-s-indacen-1-yl)(t-butylamido)$M(R)_2$;
dimethylsilylene(2,7,7-trimethyl-3,6,7,8-tetrahydro-as-indacen-3-yl)(t-butylamido)$M(R)_2$;
dimethylsilylene(7,7-dimethyl-3,6,7,8-tetrahydro-as-indacen-3-yl)(t-butylamido)$M(R)_2$;
dimethylsilylene(2,6,6-trimethyl-1,5,6,7-tetrahydro-s-indacen-1-yl)(cyclododecylamido)$M(R)_2$;
dimethylsilylene(6,6-dimethyl-1,5,6,7-tetrahydro-s-indacen-1-yl)(cyclododecylamido)$M(R)_2$;
dimethylsilylene(2,7,7-trimethyl-3,6,7,8-tetrahydro-as-indacen-3-yl)(cyclododecylamido)$M(R)_2$;
dimethylsilylene(7,7-dimethyl-3,6,7,8-tetrahydro-as-indacen-3-yl)(cyclododecylamido)$M(R)_2$;
dimethylsilylene(2,6,6-trimethyl-1,5,6,7-tetrahydro-s-indacen-1-yl)(cyclohexylamido)$M(R)_2$;
dimethylsilylene(6,6-dimethyl-1,5,6,7-tetrahydro-s-indacen-1-yl)(cyclohexylamido)$M(R)_2$;
dimethylsilylene(2,7,7-trimethyl-3,6,7,8-tetrahydro-as-indacen-3-yl)(cyclohexylamido)$M(R)_2$;
dimethylsilylene(7,7-dimethyl-3,6,7,8-tetrahydro-as-indacen-3-yl)(cyclohexylamido)$M(R)_2$;
dimethylsilylene(2,6,6-trimethyl-1,5,6,7-tetrahydro-s-indacen-1-yl)(adamantylamido)$M(R)_2$;
dimethylsilylene(6,6-dimethyl-1,5,6,7-tetrahydro-s-indacen-1-yl)(adamantylamido)$M(R)_2$;
dimethylsilylene(2,7,7-trimethyl-3,6,7,8-tetrahydro-as-indacen-3-yl)(adamantylamido)$M(R)_2$;
dimethylsilylene(7,7-dimethyl-3,6,7,8-tetrahydro-as-indacen-3-yl)(adamantylamido)$M(R)_2$;
dimethylsilylene(2,6,6-trimethyl-1,5,6,7-tetrahydro-s-indacen-1-yl)(neopentylamido)$M(R)_2$;
dimethylsilylene(6,6-dimethyl-1,5,6,7-tetrahydro-s-indacen-1-yl)(neopentylamido)$M(R)_2$;
dimethylsilylene(2,7,7-trimethyl-3,6,7,8-tetrahydro-as-indacen-3-yl)(neopentylamido)$M(R)_2$;
dimethylsilylene(7,7-dimethyl-3,6,7,8-tetrahydro-as-indacen-3-yl)(neopentylamido)$M(R)_2$;
dimethylsilylene(2-methyl-6,6-diethyl-1,5,6,7-tetrahydro-s-indacen-1-yl)(t-butylamido)$M(R)_2$;
dimethylsilylene(6,6-diethyl-1,5,6,7-tetrahydro-s-indacen-1-yl)(t-butylamido)$M(R)_2$;
dimethylsilylene(2-methyl-7,7-diethyl-3,6,7,8-tetrahydro-as-indacen-3-yl)(t-butylamido)$M(R)_2$;
dimethylsilylene(7,7-diethyl-3,6,7,8-tetrahydro-as-indacen-3-yl)(t-butylamido)$M(R)_2$;
dimethylsilylene(2-methyl-6,6-diethyl-1,5,6,7-tetrahydro-s-indacen-1-yl)(cyclododecylamido)$M(R)_2$;
dimethylsilylene(6,6-diethyl-1,5,6,7-tetrahydro-s-indacen-1-yl)(cyclododecylamido)$M(R)_2$;
dimethylsilylene(2-methyl-7,7-diethyl-3,6,7,8-tetrahydro-as-indacen-3-yl)(cyclododecylamido)$M(R)_2$;
dimethylsilylene(7,7-dimethyl-3,6,7,8-tetrahydro-as-indacen-3-yl)(cyclododecylamido)$M(R)_2$;
diethylsilylene(2,6,6-trimethyl-1,5,6,7-tetrahydro-s-indacen-1-yl)(t-butylamido)$M(R)_2$;
diethylsilylene(6,6-dimethyl-1,5,6,7-tetrahydro-s-indacen-1-yl)(t-butylamido)$M(R)_2$;
diethylsilylene(2,7,7-trimethyl-3,6,7,8-tetrahydro-as-indacen-3-yl)(t-butylamido)$M(R)_2$;
diethylsilylene(7,7-dimethyl-3,6,7,8-tetrahydro-as-indacen-3-yl)(t-butylamido)$M(R)_2$;
dimethylsilylene(2-methyl-3,6,7,8-tetrahydro-as-indacen-3-yl)(cyclohexylamido)$M(R)_2$;
dimethylsilylene(2-methyl-3,6,7,8-tetrahydro-as-indacen-3-yl)(cyclododecylamido)$M(R)_2$;
dimethylsilylene(2-methyl-3,6,7,8-tetrahydro-as-indacen-3-yl)(adamantylamido)$M(R)_2$; and
dimethylsilylene(2-methyl-3,6,7,8-tetrahydro-as-indacen-3-yl)(t-butylamido)$M(R)_2$, where M is selected from Ti, Zr, and Hf and R is selected from halogen or $C_1$ to $C_5$ alkyl, preferably R is a methyl group or a halogen group, preferably M is $T_i$.

In alternative embodiments, a catalyst system can include two or more different transition metal compounds. For purposes of the present disclosure one transition metal compound is considered different from another if they differ by at least one atom. For example "$Me_2Si$(2,7,7-$Me_3$-3,6,7,8-tetrahydro-as-indacen-3-yl)(cyclohexylamido)$TiCl_2$" is different from $Me_2Si$(2,7,7-$Me_3$-3,6,7,8-tetrahydro-as-indacen-3-yl)(n-butylamido)$TiCl_2$" which is different from $Me_2Si$(2,7,7-$Me_3$-3,6,7,8-tetrahydro-as-indacen-3-yl)(n-butylamido)$HfCl_2$.

In some embodiments, formulae I through III are referred to as mono-tetrahydroindacenyl compounds, precatalysts and/or catalysts.

In at least one embodiment, one mono-tetrahydroindacenyl compound as described herein is used in the catalyst system.

Activators

The terms "cocatalyst" and "activator" are used herein interchangeably and include a compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include non-coordinating anion compounds, alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

Alumoxane Activators

Alumoxane activators are utilized as activators in the catalyst systems described herein. Alumoxanes are generally oligomeric compounds containing —$Al(R^1)$—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from L1 to 100:1, or alternately from 1:1 to 50:1.

Non Coordinating Anion Activators

Non-coordinating anion activators may also be used herein. The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with the present disclosure are those that are compatible, stabilize the transition metal cation in the sense of balancing its ionic charge at +1, and yet retain sufficient lability to permit displacement during polymerization.

It is within the scope of the present disclosure to use an ionizing activator, neutral or ionic, such as tri (n-butyl) ammonium tetrakis (pentafluorophenyl) borate, N,N-dimethylanilinium tetrakis(pentafluorophenyl)borate, N-dimethylanilinium tetrakis(perfluoronaphthyl)borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), alone or in combination with the alumoxane or modified alumoxane activators. It is also within the scope of the present disclosure to use neutral or ionic activators in combination with the alumoxane or modified alumoxane activators.

The catalyst systems of the present disclosure can include at least one non-coordinating anion (NCA) activator. Specifically the catalyst systems may include NCAs which either do not coordinate to a cation or which only weakly coordinate to a cation thereby remaining sufficiently labile to be displaced during polymerization.

In a preferred embodiment boron containing NCA activators represented by the formula below can be used:

$$Z_d^+(A^{d-})$$

where: Z is (L-H) or a reducible Lewis acid; L is a neutral Lewis base; H is hydrogen;

(L-H) is a Bronsted acid; $A^{d-}$ is a boron containing non-coordinating anion having the charge d−; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d^+$ may also be a moiety such as silver, tropylium, carboniums, ferroceniums and mixtures, preferably carboniums and ferroceniums. Most preferably $Z_d^+$ is triphenyl carbonium. Preferred reducible Lewis acids can be any triaryl carbonium (where the aryl can be substituted or unsubstituted, such as those represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl), preferably the reducible Lewis acids as "Z" include those represented by the formula: $(Ph_3C)$, where Ph is a substituted or unsubstituted phenyl, preferably substituted with $C_1$ to $C_{40}$ hydrocarbyls or substituted a $C_1$ to $C_{40}$ hydrocarbyls, preferably $C_1$ to $C_{20}$ alkyls or aromatics or substituted $C_1$ to $C_{20}$ alkyls or aromatics, preferably Z is a triphenylcarbonium.

When $Z_d^+$ is the activating cation $(L\text{-}H)_d^+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ wherein k is 1, 2, or 3; n is 1, 2, 3, 4, 5, or 6 (preferably 1, 2, 3, or 4); n−k=d; M is an element selected from group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds which may be used as an activating cocatalyst are the compounds described as (and particularly those specifically listed as) activators in U.S. Pat. No. 8,658,556, which is incorporated by reference herein.

Most preferably, the ionic activator $Z_d^+$ $(A^{d-})$ is one or more of N,N-dimethylanilinium tetrakis(pentafluorophenyl) borate, N,N-dimethylanilinium tetrakis(perfluoronaphthyl) borate, N,N-dimethylanilinium tetrakis(perfluorobiphenyl) borate, N,N-dimethylanilinium tetrakis(3,5-bis (trifluoromethyl)phenyl)borate, triphenylcarbenium tetrakis (perfluoronaphthyl)borate, triphenylcarbenium tetrakis (perfluorobiphenyl)borate, triphenylcarbenium tetrakis(3,5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

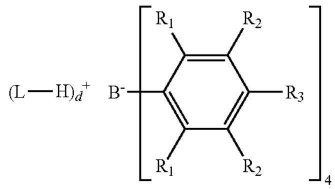

or

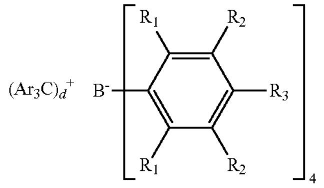

where: each $R_1$ is, independently, a halide, preferably a fluoride; Ar is substituted or unsubstituted aryl group (preferably a substituted or unsubstituted phenyl), preferably substituted with $C_1$ to $C_{40}$ hydrocarbyls, preferably $C_1$ to $C_{20}$ alkyls or aromatics; each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group); each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring); and L is an neutral Lewis base; $(L-H)^+$ is a Bronsted acid; d is 1, 2, or 3; wherein the anion has a molecular weight of greater than 1020 g/mol; wherein at least three of the substituents on the B atom each have a molecular volume of greater than 250 cubic Å, alternately greater than 300 cubic Å, or alternately greater than 500 cubic Å.

Preferably $(Ar_3C)_d^+$ is $(Ph_3C)_d^+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
|---|---|
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

For a list of particularly useful Bulky activators please see U.S. Pat. No. 8,658,556, which is incorporated by reference herein.

In another embodiment, one or more of the NCA activators is chosen from the activators described in U.S. Pat. No. 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $Me_3NH^+][B(C_6F_5)_4^-]$; 1-(4-(tris(pentafluorophenyl)borate)-2,3,5,6-tetrafluorophenyl)pyrrolidinium; and tetrakis(pentafluorophenyl) borate, and 4-(tris(pentafluorophenyl)borate)-2,3,5,6-tetrafluoropyridine.

In at least one embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6- tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

In preferred embodiments of the invention, N,N-dimethylanilinium tetrakis(perfluoronaphthyl)borate is the preferred activator.

The typical NCA activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

Activators useful herein also include those described in U.S. Pat. No. 7,247,687 at column 169, line 50 to column 174, line 43, particularly column 172, line 24 to column 173, line 53.

It is also within the scope of the present disclosure that the catalyst compounds can be combined with combinations of alumoxanes and NCA's (see for example, U.S. Pat. Nos. 5,153,157, 5,453,410, EP 0 573 120 B1, WO 94/07928, and WO 95/14044 which discuss the use of an alumoxane in combination with an ionizing activator).

Optional Scavengers or Co-Activators

In addition to the activator compounds, scavengers, chain transfer agents or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Useful chain transfer agents that may also be used herein are typically a compound represented by the formula $AlR_3$, $ZnR_2$ (where each R is, independently, a $C_1$-$C_8$ aliphatic radical, preferably methyl, ethyl, propyl, butyl, pentyl, hexyl octyl or an isomer thereof) or a combination thereof, such as diethyl zinc, trimethylaluminum, triisobutylaluminum, trioctylaluminum, or a combination thereof.

In some embodiments, the catalyst compounds described herein may be supported (with or without an activator) by any method effective to support other coordination catalyst systems, effective meaning that the catalyst so prepared can be used for oligomerizing or polymerizing olefin in a heterogeneous process. The catalyst precursor, activator, co-activator if needed, suitable solvent, and support may be added in any order or simultaneously. Typically, the complex and activator may be combined in solvent to form a solution. Then the support is added, and the mixture is stirred for 1 minute to 10 hours. The total solution volume may be greater than the pore volume of the support, but some embodiments limit the total solution volume below that needed to form a gel or slurry (about 90% to 400%, preferably about 100-200% of the pore volume). After stirring, the residual solvent is removed under vacuum, typically at ambient temperature and over 10-16 hours. But greater or lesser times and temperatures are possible.

The complex may also be supported absent the activator; in that case, the activator (and co-activator if needed) is added to a polymerization process's liquid phase. Additionally, two or more different complexes may be supported on the same support. Likewise, two or more activators or an activator and co-activator may be supported on the same support.

Suitable solid particle supports are typically comprised of polymeric or refractory oxide materials, each being preferably porous. A support material can have an average particle size greater than 10 μm for use in embodiments of the present disclosure. VA support material can be a porous support material, such as, talc, inorganic oxides, inorganic chlorides, for example magnesium chloride and resinous support materials such as polystyrene polyolefin or polymeric compounds or any other organic support material and the like. A support material can be an inorganic oxide material including group-2, -3, -4, -5, -13, or -14 metal or metalloid oxides. A catalyst support materials can be silica, alumina, silica-alumina, and their mixtures. Other inorganic oxides may serve either alone or in combination with the silica, alumina, or silica-alumina. These are magnesia, titania, zirconia, and the like. Lewis acidic materials such as montmorillonite and similar clays may also serve as a support. In this case, the support can optionally double as the activator component, however, an additional activator may also be used.

The support material may be pretreated by any number of methods. For example, inorganic oxides may be calcined, chemically treated with dehydroxylating agents such as aluminum alkyls and the like, or both.

As stated above, polymeric carriers will also be suitable in accordance with the present disclosure, see for example the descriptions in WO 95/15815 and U.S. Pat. No. 5,427,991. The methods disclosed may be used with the catalyst complexes, activators or catalyst systems of the present disclosure to adsorb or absorb them on the polymeric supports, particularly if made up of porous particles, or may be chemically bound through functional groups bound to or in the polymer chains.

Useful supports typically have a surface area of from 10-700 $m^2/g$, a pore volume of 0.1-4.0 cc/g and an average particle size of 10-500 m. Some embodiments select a surface area of 50-500 $m^2/g$, a pore volume of 0.5-3.5 cc/g, or an average particle size of 20-200 μm. Other embodiments select a surface area of 100-400 $m^2/g$, a pore volume of 0.8-3.0 cc/g, and an average particle size of 30-100 μm. Useful supports typically have a pore size of 10-1000 Angstroms, alternatively 50-500 Angstroms, or 75-350 Angstroms.

The catalyst complexes described herein are generally deposited on the support at a loading level of 10-100 micromoles of complex per gram of solid support; alternately 20-80 micromoles of complex per gram of solid support; or 40-60 micromoles of complex per gram of support. But greater or lesser values may be used provided that the total amount of solid complex does not exceed the support's pore volume.

In an alternative embodiment, catalyst complexes and catalyst systems described herein may be present on a fluorided support, e.g. a support, desirably particulate and porous, which has been treated with at least one inorganic fluorine containing compound. For example, the fluorided support composition can be a silicon dioxide support wherein a portion of the silica hydroxyl groups has been replaced with fluorine or fluorine containing compounds. For example, a useful support herein, is a silica support treated with ammonium hexafluorosilicate and/or ammonium tetrafluoroborate fluorine compounds. Typically the fluorine concentration present on the support is in the range of from 0.1 to 25 wt %, alternately 0.19 to 19 wt %, alternately from 0.6 to 3.5 wt %, based upon the weight of the support.

In an embodiment of the present disclosure, the catalyst system comprises fluorided silica, alkylalumoxane activator, and the bridged monocyclopentadienyl group 4 transition metal compound, where the fluorided support has not been calcined at a temperature of 400° C. or more.

The catalyst compound may be present on a support at 1 to 100 μmol/g supported catalyst, preferably 20-60 μmol/g supported catalyst.

The present disclosure also relates to metallocene catalyst systems comprising the reaction product of at least three components: (1) one or more bridged metallocenes having one tetrahydroindacenyl group; (2) one or more alkylalumoxane or NCA activator; and (3) one or more fluorided support compositions, where the fluorided support composition has not been calcined at 400° C. or more, preferably the fluorided support composition has been calcined at a temperature of 100° C. to 395° C., alternately 125° C. to 350° C., alternately 150° C. to 300° C.).

Typically, the fluorided supports described herein are prepared by combining a solution of polar solvent (such as water) and fluorinating agent (such as $SiF_4$ or $(NH_4)_2SiF_6$) with a slurry of support (such as a toluene slurry of silica), then drying until it is free flowing, and optionally, calcining (typically at temperatures over 100° C. for at least 1 hour). The supports are then combined with activator(s) and catalyst compound (separately or together).

For more information on fluorided supports and methods to prepare them, please see U.S. Ser. No. 62/149,799, filed Apr. 20, 2015 (and all cases claiming priority to or the benefit of U.S. Ser. No. 62/149,799); U.S. Ser. No. 62/103,372, filed Jan. 14, 2015 (and all cases claiming priority to or the benefit of U.S. Ser. No. 62/103,372); and PCT/US2015/067582, filed Dec. 28, 2015 which are incorporated by reference herein.

The tackifiers modify the viscosity of the PSA, improve the tack of the PSA, and improve wetting during the application. Tackifiers may be produced from petroleum-derived hydrocarbons and monomers of feedstock including tall oil and other polyterpene or resin sources. The tackifiers can include aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, hydrogenated rosin acids, hydrogenated rosin esters, derivatives thereof, and the like, and any combination thereof, for example. The PSAs described herein can have about 10 wt % to about 65 wt % of a tackifier. Other preferred ranges of the amount of tackifier in the PSAs include, but are not limited to, about 10 wt % to about 25 wt %, or about 20 wt % to about 35 wt %, or about 30 wt % to about 45 wt %, or about 40 wt % to about 55 wt %, or about 50 wt % to about 65 wt %.

The PSAs described herein may include one or more oils. Examples of oils include, but are not limited to, aliphatic naphthenic oils, white oils, and the like, and any combination thereof. The aliphatic naphthenic oils may include di-iso-undecyl phthalate (DIUP), di-iso-nonylphthalate (DINP), dioctylphthalates (DOP), any derivative thereof, and the like, and any combination thereof. The PSAs described herein may comprise from 0 wt % to about 40 wt % of the oil component. When included, other preferred ranges of the amount of oil in the PSAs include, but are not limited to, about 1 wt % to about 15 wt %, or about 5 wt % to about 20 wt %, or about 15 wt % to about 30 wt %, or about 25 wt % to about 40 wt %. A PSA described herein may be absent (or not comprise) an oil.

The PSAs may also include one or more additives. Examples of additives include, but are not limited to, antioxidants, plasticizers, waxes, stabilizers, pigments, dyestuffs, antiblock additives, polymeric additives, defoamers, preservatives, thickeners, rheology modifiers, humectants, fillers, surfactants, processing aids, cross-linking agents, neutralizing agents, flame retardants, fluorescing agents, compatibilizers, antimicrobial agents, water, and any combination thereof.

When present, the PSAs described herein may comprise from 0 wt % to about 40 wt % of another additive individually. Other preferred ranges of the amount of additive individually in the PSAs include, but are not limited to, 0 wt % to about 10 wt %, or about 1 wt % to about 15 wt %, or about 10 wt % to about 25 wt %, or about 15 wt % to about 30 wt %, or about 25 wt % to about 40 wt %.

For example, antioxidants may assist in protecting an adhesive against degradation caused by reaction with atmospheric oxygen. Examples of antioxidants include, but are not limited to, amines, hindered phenols, organophosphites, thioesters, and the like, and any combination thereof.

Examples of fillers may include, but are not limited to, silicates (e.g., talc, clay), silicas, carbonates (e.g., $CaCO_3$), carbon (e.g., carbon black, graphite), and the like, and any combination thereof.

Ultra-violet (UV) stabilizers are used to reduce the damage caused by exposure to light, oxygen and heat in outdoor environments. Examples of UV stabilizers may include, but are not limited to, carbon black, oxides (e.g., $TiO_2$, ZnO), benzophenones, benzotrazoles, aryl esters, sterically hindered amines, and the like, and any combination thereof.

The PSAs described herein may be prepared by compounding (or otherwise mixing) the components of the PSA. Optionally, a solvent may be include with the PSA components to assist with applying the PSA to a substrate. Examples of solvents may include, but are not limited to, hydrocarbon solvents (i.e., heptane, hexane), ketones (i.e., acetone, methyl ethyl ketone), esters (i.e., propyl acetate), or aromatic solvents (i.e., toluene, xylene). The solvent may be present at about 30 wt % to about 70 wt % of the mixture of the solvent and the PSA components.

The PSAs described herein may be applied to a substrate using a variety of known printing and/or coating techniques including solvent coating, hot melt coating, roll coating (e.g., rotogravure coating), transfer roll coating, Meyer rod coating, and drop die coating. Suitable materials from which the substrates may be made include, but are not limited to, paper, plastic (e.g., a polyolefin, a polyester, a PVC, a acetate, a cellophane, nylon, a bioplastic, a biodegradable plastic, and the like), glass, wood, cement, silicone, metal, and the like, and any combination thereof. The substrate may be a film, sheet, or other suitable material. In some instances, the material forming the substrate may be foamed.

For example, the PSAs described herein may be applied to a substrate by solvent coating. Generally, solvent coating methods include forming (e.g., compounding or otherwise mixing) a mixture of the solvent (e.g., as described above) and the PSA components. The mixture is then coated onto a substrate, and the solvent is allowed to evaporate leaving behind the PSA on the substrate.

In another example, the PSAs described herein may be applied to a substrate by hot melting coating process. The process comprises preheating the PSA components to form a molten blend (e.g., about 110° C. to about 250° C.). The molten blend is then applied to substrates and allowed to cool.

In another example, the PSAs described herein may be deposited on a substrate and then, at a given temperature (e.g., about 110° C. to about 250° C.), laminated the layer of pressure-sensitive adhesive onto the substrate.

In any printing and/or coating technique, the substrate to which the PSA is applied may be the substrate for the ultimate application or an intermediate, removable substrate (e.g., a release liner).

Examples of products that may be suitable for incorporating the PSAs described herein include, but are not limited to, labels, tapes, transfer tapes, decal, decorative sheets, protective sheets, sticky notes, diaper tabs, hygiene care products, assembly of (consumer) electronics, glass mounting tapes, and the like.

Properties of Pressure-Sensitive Adhesives

As mentioned above, the dynamic mechanical analysis (DMA) properties are important factors in adhesive applications and are dependent upon at least formulation. The storage modulus G' exhibits a plateau region between the two domain transition temperatures $T_g$ and $T_m$. The position of modulus plateau can be adjusted by adding compatible tackifier, or any other additive such as oil. The addition of compatible tackifier reduces the storage modulus, and shifts the low $T_g$ to a higher temperature. The addition of oil also reduces the modulus plateau. By adding tackifier, and optionally any other additive such as oil, an adhesive can have a modulus plateau at a preferred height under a certain temperature, which is also referred to as "PSA window." A preferred "PSA window" is constructed from the values of dynamic storage modulus G' at frequencies of $10^{-2}$ rad/sec and $10^2$ rad/sec. For most PSAs, the range of G' at room temperature within these selected frequencies falls between $10^3$ and $10^6$ Pa. A preferred "PSA window" described herein has a G' of about $2*10^4$ Pa to about $2*10^5$ Pa under at least one temperature between −10° C. and 25° C.

The PSAs of the present disclosure may have a Tg of about −100° C. to about 20° C. Other preferred ranges include, but are not limited to, about −100° C. to about −25° C. or about −30° C. to about 0° C. or about −20° C. to about 20° C. A Tg below 0° C. indicates that the adhesive will remain sticky in the refrigerator, while a Tg below −18° C. indicates that the adhesive will remain sticky in the freezer.

Peel adhesion evaluates the force required to break the bond between a PSA and a standard test plate at a specified angle and can be determined according to PSTC-101 16$^{th}$ Ed (Pressure Sensitive Tape Council, Method 101, 16$^{th}$ Edition). Unless otherwise specified, the peel adhesion herein is tested at 90 degrees, under a temperature of about 20° C. to about 27° C. and a relative humidity of about 20% to about 80%. The standard test plate may include, but is not limited to, stainless steel (type 304 with a bright annealed finish), low density polyethylene, glass, or any other substrate of interest. The standard test plates meet the requirements as specified in the Pressure Sensitive Tape Council test methods manual Appendage B Section 2.6 and ASTM D3330-04(2008) Section 6.3. These methods specify type 304 stainless steel with a bright annealed finish. The content of the stainless steel complies with the specifications required by ASTM A666-15. The surface roughness shall be 50±25 nm (2.0±1.0 μin.) arithmetical average deviation from the mean profile. The thickness shall be no less than 1.1 mm (0.043 in.). The dimensions for a typical Peel Adhesion panel are 50 by 125 mm (2 by 5 in) with the machine direction parallel to the 125 mm direction.

The 90° peel force, as a measure of peel adhesion, of the PSAs of present disclosure, when adhered to a low density polyethylene (LDPE), may be about 700 g (grams) to about 2000 g. Other preferred ranges of the 90° peel force, when adhered to a low density polyethylene, include, but are not limited to, about 700 g to about 1200 g, or about 1000 g to about 1500 g, or about 1200 g to about 1700 g, or about 1500 g to about 2000 g. The 900 peel force of the PSAs of present disclosure, when adhered to a stainless steel, may be about 100 g to about 5000 g. Other preferred ranges of the 900 peel force, when adhered to a stainless steel, include, but are not limited to, about 100 g to about 1000 g, or about 1000 g to about 2000 g, or about 2000 g to about 3000 g, or about 3000 g to about 4000 g, or about 4000 g to about 5000 g.

Loop tack test determines a tack force, which is the tack properties of a PSA that forms a bond of measurable strength rapidly upon contact with another surface. As used herein, the tack force of a sample is determined according to PSTC-16 Method B 16$^{th}$ Ed. Unless otherwise specified, the loop tack test herein is performed under the same temperature and pressure using the same substrate as the peel adhesion test, under a temperature of about 20° C. to about 27° C. and a relative humidity of about 20% to about 80%.

The tack force of the PSAs of present disclosure, when adhered to a low density polyethylene, may be about 1 g to about 1800 g. Other preferred ranges of the tack force, when adhered to a low density polyethylene, include, but are not limited to, about 1 g to about 500 g, or about 500 g to about 1000 g, or about 1000 g to about 1500 g, or about 1500 g to about 1800 g. The tack force of the PSAs of present disclosure, when adhered to a stainless steel, may be about 1 g to about 500 g. Other preferred ranges of the tack force, when adhered to a stainless steel, include, but are not limited to, about 1/s to about 100 g, or about 100 g to about 200 g, or about 200 g to about 300 g, or about 300 g to about 400 g, or about 400 g to about 500 g.

Static shear adhesion measures the time at which bond failure occurs under a defined temperature (e.g., room temperature) under a defined stress, and can be determined according to PSTC-107 16$^{th}$ Ed. Unless otherwise specified, the static shear adhesion herein is tested under the same temperature and pressure using the same substrate as the peel adhesion test, with a contact area of 1 inch by 1 inch and a static load of 500 g.

The static shear of the PSAs of present disclosure, when adhered to a low density polyethylene, may be about 60 min to about 200 min or greater. Other preferred ranges of the static shear, when adhered to a low density polyethylene, include, but are not limited to, about 60 min to about 100 min, or about 100 min to about 150 min, or about 150 min to about 200 min. The static shear of the PSAs of present disclosure, when adhered to a stainless steel may be about 1 min to about 200 min or greater. Other preferred ranges of the static shear, when adhered to a stainless steel, include, but are not limited to, about 1 min to about 50 min, or about 50 min to about 100 min, or about 100 min to about 150 min, or about 150 min to about 200 min.

Mandrel tests investigate how well a PSA adheres to a curved surface. MYLAR™ polyester (PET) films having a PSA thereon are cut to a certain size of strips and adhered to an aluminum can or a glass bottle. The mandrel test evaluates the time when the adhesives release themselves from the curved surface. The PSAs of present disclosure may exhibit no evidence of bond failure (e.g., corners or edges peeling away from the curved surface) for at least 1 week. Other preferred ranges of exhibiting no bond failure in a Mandrel test, when adhered to an aluminum can and/or a glass bottle, include, but are not limited to, at least 2 weeks, at least 3 weeks, at least 4 weeks, at least 6 week, at least 8 weeks, or longer.

The PSAs described herein may advantageously have a clear visual determination, which enables clear high-quality, clear label applications, for example. The visual determination is performed as described in US Patent App. Pub. No. 2013/0130027, which is incorporated herein by reference. The visual determination consists of providing a testing square consisting of a piece of white 20 weight paper having a brightness of 90%. The paper may have a higher weight, and 20 pound weight paper should be considered the minimum for use. Likewise, the paper may have a higher brightness, and 90% brightness should be considered the minimum brightness. The testing square having a printed portion comprising the capital letters "O" and "Q" printed with a laser printer to be visually distinguishable at 1 space apart from each other thereon in black print using Helvetica number 10 font; depositing a sample of the composition at a temperature above the melting point of the composition onto the testing square using a flat applicator to cover the printed portion of the testing square with a film of the composition having a thickness of 1 mm, followed by allowing the composition to cool to a temperature of 25° C. to produce a prepared test sample. The method then includes visually determining the clarity of the prepared test sample wherein the prepared test sample has a clear visual determination when an observer having essentially 20:20 vision is able to visually distinguish the letter "0" from the letter "Q" in the printed portion of the testing square at a distance of about 30 cm from the prepared test sample at an illumination of at least 1000 lux, which should be considered the minimum, with an illumination from 1000 lux to 2000 lux being acceptable.

The peel, tack, and shear properties of the PSAs are dependent, among other things, on the formulation, coating thickness, rub-down and temperature. The PSAs described herein can be removable or permanent and can be used in labels, tapes, decal, decorative and protective sheets, and other specialty areas. Particularly, the PSAs described herein have a high level of transparency or clarity, suitable for no-label look applications.

A nonlimiting example pressure-sensitive adhesive comprises: about 18 wt % to about 90 wt % of a propylene-ethylene(-diene) (PE(D)M) copolymer comprising (a) about 60 wt % to about 99 wt % propylene, (b) about 1 wt % to about 40 wt % ethylene or a C4 to C22 alpha-olefin, and (c) 0 wt % to about 20 wt % diene, wherein the PE(D)M copolymer has a heat of fusion of about 15 J/g or less; about 10 wt % to about 65 wt % of a tackifier; and 0 wt % to about 40 wt % of an oil. The pressure-sensitive adhesive may further include one or more of: Element 1: wherein the PE(D)M copolymer has a melt flow rate (2.16 kg at 230° C.) of about 0.1 g/10 min or greater; Element 2: wherein the PE(D)M copolymer has a melt flow rate (2.16 kg at 230° C.) of about 10 g/10 min or less, and wherein the pressure-sensitive adhesive further comprises a solvent; Element 3: wherein the PE(D)M copolymer has a melt flow rate (2.16 kg at 230° C.) of about 5 g/10 min to about 30 g/10 min; Element 4: wherein the PE(D)M copolymer has a heat of fusion of about 8 J/g or less (or about 1 J/g or less); Element 5: wherein the C4 to C22 alpha-olefin is a C4 to C12 alpha-olefin; Element 6: wherein the PE(D)M copolymer has a Mooney viscosity (ML(1+4) 125° C.) about 5 MU to about 100 MU; Element 7: wherein the PE(D)M copolymer has a glass transition temperature of about −50° C. to about −15° C.; Element 8: wherein the tackifier is selected from the group consisting of a saturated tackifier, an aliphatic tackifier, an aromatic modified tackifier, and any combination thereof; Element 9: wherein the pressure-sensitive adhesive has a clear visual determination; Element 10: wherein the pressure-sensitive adhesive has a tack force of about 1 g to about 1800 g on low density polyethylene, according to PSTC-16 Method B; Element 11: wherein the pressure-sensitive adhesive has a tack force of about 1 g to about 500 g on stainless steel, according to PSTC-16 Method B; Element 12: the pressure-sensitive adhesive has a peel force of about 700 g to about 2000 g at 900 ramp angle on low density polyethylene according to PSTC-101; Element 13: wherein the pressure-sensitive adhesive has a peel force of about 100 g to about 5000 g at 90° ramp angle on stainless steel according to PSTC-101; Element 14: wherein the pressure-sensitive adhesive has a static shear adhesion time to low density polyethylene of about 60 min to about 200 min with a 1000 g weight and 0.5 in.×0.5 in. surface area according to PSTC-107; and Element 15: wherein the pressure-sensitive adhesive has a static shear adhesion time to stainless steel of about 1 min to about 200 min with a 1000 g weight and 0.5 in.×0.5 in. surface area according to PSTC-107. Examples of combinations include, but are not limited to, one of Elements 1-3 in combination with one or more of Elements 4-7 and optionally in further combination with one or more of Elements 8-15; one of Elements 1-3 in combination with one or more of Elements 8-15; two or more of Elements 4-7 in combination; two or more of Elements 8-15 in combination; and one or more of Elements 4-7 in combination with one or more of Elements 8-15.

A nonlimiting example method comprises: depositing a layer of the foregoing pressure-sensitive adhesive (optionally including one or more of Elements 1-15, and preferably having a melt flow rate (2.16 kg at 230° C.) of about 5 g/10 min to about 30 g/10 min) that is at about 110° C. to about 250° C. onto a substrate; and cooling the pressure-sensitive adhesive.

Another nonlimiting example method comprises: depositing a layer of mixture comprising the foregoing pressure-sensitive adhesive (optionally including one or more of Elements 1-15, and preferably having a melt flow rate (2.16 kg at 230° C.) of about 10 g/10 min or less) and a solvent onto a substrate; and evaporating the solvent.

In the foregoing methods, the substrate may comprise a material selected from the group consisting of: paper, plastic, glass, wood, cement, silicone, metal, and any combination thereof.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

The following examples are illustrative of the invention. Materials used in the preparation of the examples are as follow: ESCOREZ™ 5380 (cycloaliphatic hydrocarbon resin, available from ExxonMobil), ESCOREZ™ 5400 (cycloaliphatic hydrocarbon resin, available from ExxonMobil), ESCOREZ™ 5600 (aromatic modified cycloaliphatic hydrocarbon resin, available from ExxonMobil), PRIMOL™ 352 (saturated hydrocarbon, available from Exxon Mobil), NYFLEX® 222B (hydrotreated naphthenic oil, available from Nynas), IRGANOX® 1010 (sterically hindered phenolic primary antioxidant, available from BASF), VECTOR® 4186A (styrenic block copolymer, available from TSRC Corporation/Dexco Polymers), VISTAMAXX™ 6202 (isotactic propylene-based elastomer, available from ExxonMobil Chemical).

Table 1 illustrates the polymer characteristics of several PE(D)M copolymers used in making a plurality of compounds. C2% and ENB % indicate the weight percentage of ethylene and diene in the PE(D)M copolymers. Each of the PE(D)M copolymers have a heat of fusion Hf of 0 J/g. The Hf of the PEDM-1 was still 0 J/g (undetectable) after the DSC experiment and subsequently aging at room temperature for 4 weeks as measured from the first heating cycle.

TABLE 1

Polymer Compositions

| Sample | C2% | ENB % | MFR (g/10 min) | Mn (LS) (g/mol) | Mw (LS) (g/mol) | $T_g$ (° C.) |
|---|---|---|---|---|---|---|
| PEDM-1 | 4.6 | 2.8 | 7.1 | 83000 | 168000 | −6.2 |
| PEDM-2 | 9.7 | 2.7 | 7.2 | 78000 | 164000 | −14 |
| PEDM-3 | 15.3 | 2.8 | 6.8 | 73000 | 154000 | −18 |
| PEM-1 | 36.0 | 0 | 34 | 37000 | 103000 | −46 |
| PEM-2 | 19.5 | 0 | 889 | 19000 | 43000 | −31 |
| PEM-3 | 19.8 | 0 | 232 | 25000 | 59000 | −29 |
| PEM-4 | 20.3 | 0 | 32 | 37000 | 94000 | −29 |
| Sample | mm | mr | rr | m | r | m/r |
| PEDM-1 | 0.18 | 0.30 | 0.52 | 0.33 | 0.67 | 0.50 |
| PEDM-2 | 0.20 | 0.20 | 0.60 | 0.30 | 0.70 | 0.43 |

The tacticity is calculated from integrating the $CH_3$ region of the propylene unit where the regions are defined as:

| | |
|---|---|
| mm region | 21.20-20.5 ppm |
| mr region | 20.5-19.75 ppm |
| rr region | 19.75-18.7 ppm |

To account for the portion of the EP sequence that overlaps in the mr and rr regions, the CH EPE peak at 32.8 ppm and the CH EPP peak at 30.5 ppm were used to remove the EPE and EPP contribution.

| | |
|---|---|
| mm region | 21.20-20.5 ppm |
| mr region | (20.5-19.75 ppm - CH EPP) |
| rr region | (19.75-18.7 ppm - CH EPE) |

The sum or "total" of the integrals of the mm, mr and rr regions are used to calculate the percentage of mm, mr and rr triads where "total"=mm+mr+rr.

$$\% \ mm = mm*100/\text{total}$$

$$\% \ mr = mr*100/\text{total}$$

$$\% \ rr = rr*100/\text{total}$$

Regio-defects and ENB sequence effects are not accounted for in the tacticity calculation. Their contribution is assumed to be negligible.

Percent dyad, m and r, are calculated from:

$$m = \% \ mm + (0.5*\% \ mr)$$

$$r = \% \ rr + (0.5*\% \ mr).$$

The "propylene tacticity index", expressed herein as [m/r], is calculated from the corrected integral regions as described above. When [m/r] is 0 to less than 1.0, the polymer is generally described as syndiotactic, when [m/r] is 1.0 the polymer is atactic, and when [m/r] is greater than 1.0 the polymer is generally described as isotactic.

Adhesive compositions comprising a PEDM copolymer, a tackifier, an oil, and an antioxidant were prepared by solvent coating. The adhesive compositions comprise about 40.5 wt % PEDM-3 copolymer, about 50.5 wt % of different tackifiers, about 8.5 wt % of an oil, and 0.5 wt % of an antioxidant. The PEDM copolymer shows good compatibility with both saturated tackifier (ESCOREZ™ 5400), an aliphatic tackifier, and aromatic modified tackifier (ESCOREZ™ 5600). The pressure-sensitive adhesive have a viscoelastic property with a storage modulus G' plateau of 10' to $10^6$ Pa under at least one temperature of about −10° C. to about 25° C., as shown in FIG. 1.

Table 2 illustrates a plurality of adhesive compositions, with the tackifier being ESCOREZ™ 5400, the oil being NYFLEX® 222B, and the antioxidant being IRGANOX® 1010. Adhesive compositions 101 to 107 were prepared by solvent coating using a Drawdown Coater, wherein about 50 wt % toluene is used as solvent. Adhesive composition 108 was hot melt coated at a coating speed of 12 inch/min, and a reservoir temperature at 392° F. The adhesive composition was coated at a 1 mil (0.025 mm) coat weight onto a release liner. The adhesive composition was then laminated to a 2 mil (0.051 mm) PET film. A PSA Control was prepared with 40.5 wt % a polystyrene-polyisoprene-polystyrene (SIS) copolymer, 50.5 wt % tackifier, 8.5 wt % oil, and 0.5 wt % antioxidant.

TABLE 2

Adhesive Compositions
solvent coated on MYLAR ™ PET films

| Sample | PEDM-1 (wt %) | PEDM-2 (wt %) | PEDM-3 (wt %) | Tackifier (wt %) | Oil (wt %) | Anti-oxidant (wt %) |
|---|---|---|---|---|---|---|
| 101 | 40.5 | | | 50.5 | 8.5 | 0.5 |
| 102 | 40.5 | | | 45.5 | 13.5 | 0.5 |
| 103 | | 40.5 | | 50.5 | 8.5 | 0.5 |
| 104 | | 40.5 | | 45.5 | 13.5 | 0.5 |
| 105 | | | 40.5 | 50.5 | 8.5 | 0.5 |

TABLE 2-continued

| Adhesive Compositions solvent coated on MYLAR ™ PET films | | | | | | |
|---|---|---|---|---|---|---|
| Sample | PEDM-1 (wt %) | PEDM-2 (wt %) | PEDM-3 (wt %) | Tackifier (wt %) | Oil (wt %) | Anti-oxidant (wt %) |
| 106 | | | 40.5 | 45.5 | 13.5 | 0.5 |
| 107 | | | 40.5 | 35 | 24 | 0.5 |
| 108 | | | 40.5 | 35 | 24 | 0.5 |

Figure 2:
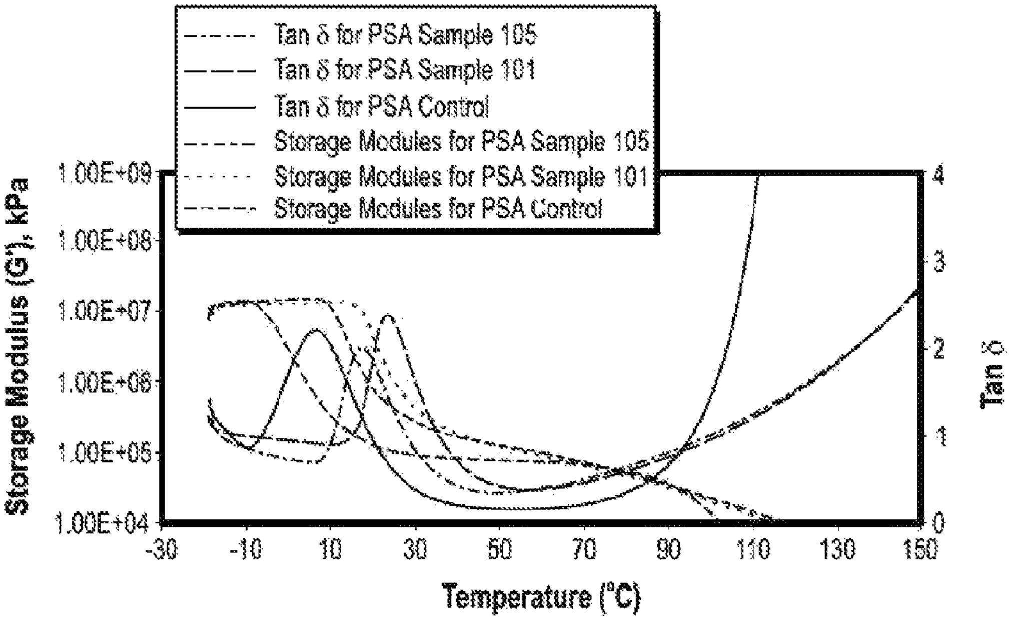
FIGS. 2 and 3 illustrate the DMA analysis of PSAs comprising different PEDM copolymers with different amounts of tackifiers and oils.
Figure 3:
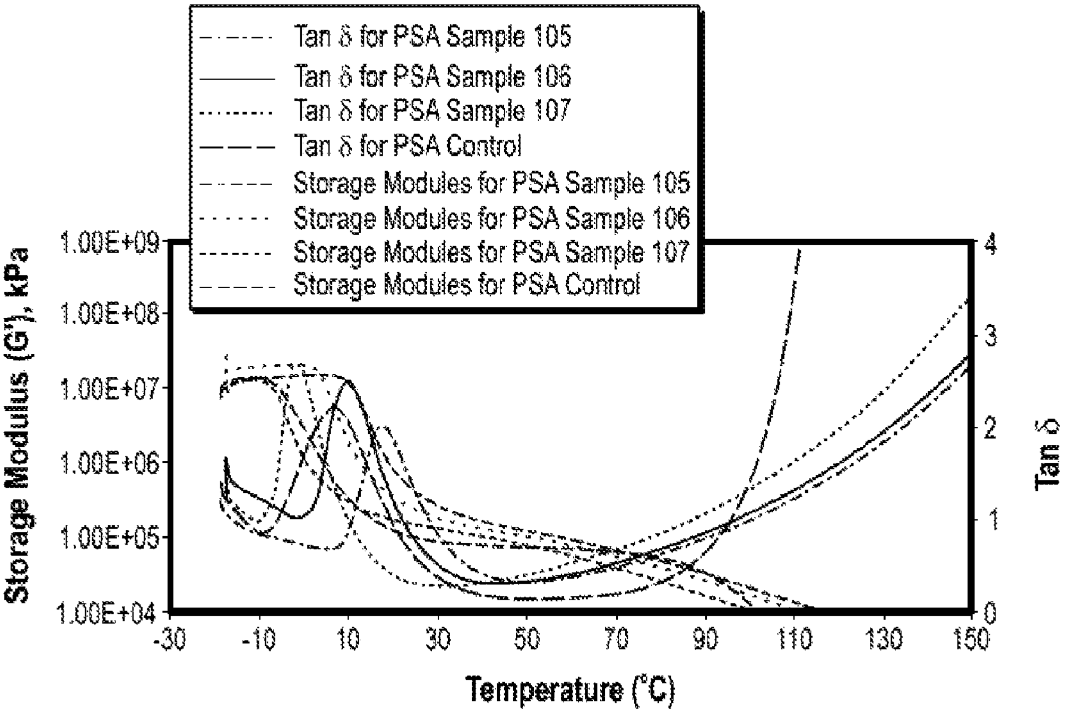

FIG. 2 shows the storage modulus G' (dashed) and loss factor tan δ (solid) of adhesive compositions 101 and 105. The adhesive compositions made with PEDM copolymer containing 15 wt % ethylene content shows a lower storage modulus than the 5 wt % ethylene content. FIG. 3 shows the storage modulus G' (dashed) and loss factor tan δ (solid) of adhesive compositions 105, 106, and 107. The modulus plateau of adhesive compositions is adjusted to overlap with the preferred "PSA window" with the addition of tackifier and oil, indicating that the rheology properties of an adhesive can be adjusted by at least the formulation. And the formulation may be further optimized for suitable applications.

Figure 4:
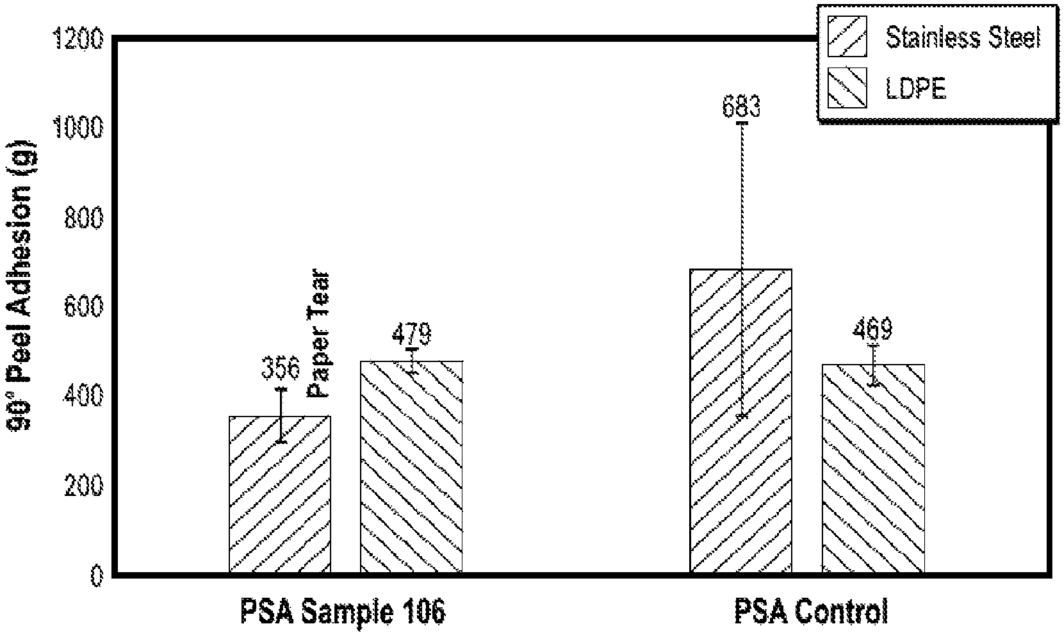
FIGS. 4 to 6 illustrate the peel force, tack force, and static shear of PSAs comprising PEDM copolymers with different amounts of tackifiers and oils.
Figure 5:
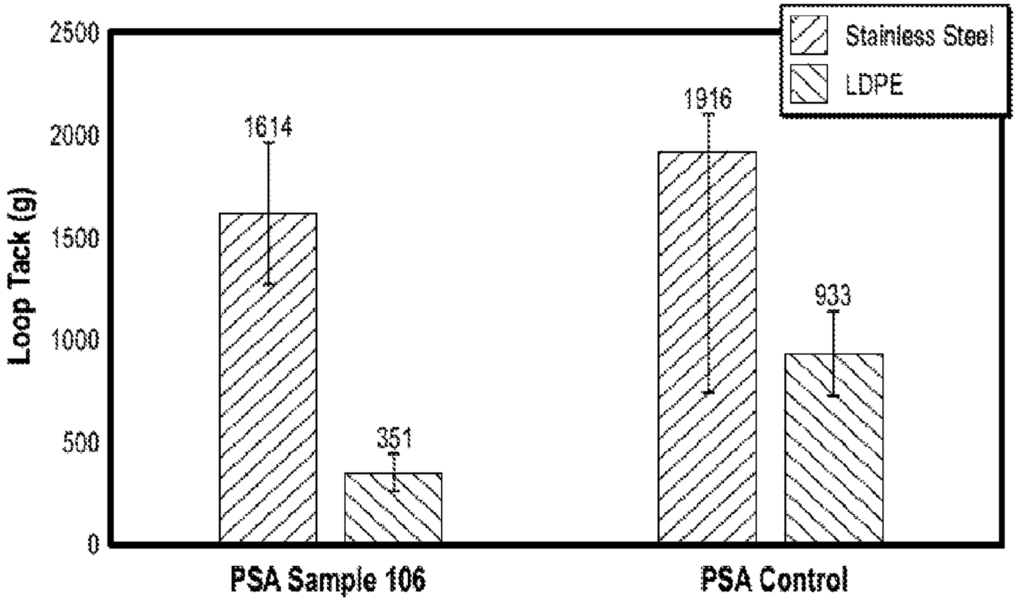
Figure 6:
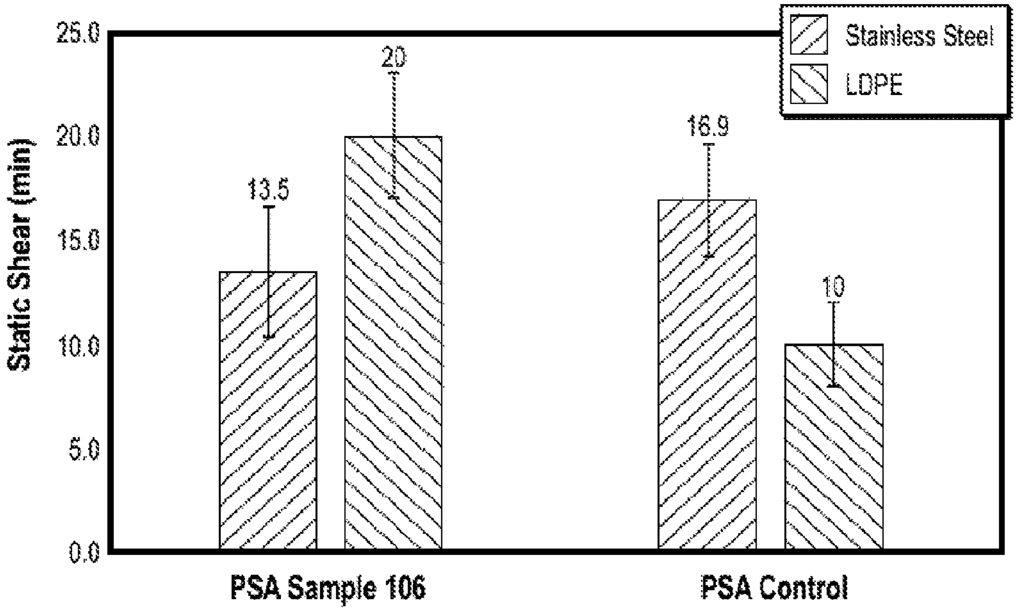

The peel force, tack force, and static shear were measured by PSTC methods, as above mentioned, on substrates including low density polyethylene and stainless steel. The adhesive compositions presented in Table 2 have a peel force of about 700 g to about 2000 g on low density polyethylene and about 100 g to about 300 g on stainless steel, both at 900 ramp angle. The PSAs have a tack force of about 1 g to about 1800 g on low density polyethylene, and about 1 g to about 500 g on stainless steel. The adhesive compositions have a static shear adhesion time of up to about 200 min with a 1,000 g static load weight and 0.5 inch by 0.5 inch contact area. More specifically, FIGS. 4 to 6 illustrate the peel force, tack force, and static shear for the PSA Sample 106 and the SCOTCH™ tape (product code 610).

Above mentioned adhesive compositions comprising PEDM copolymers with a low MFR are suitable for removable applications.

Figure 7:
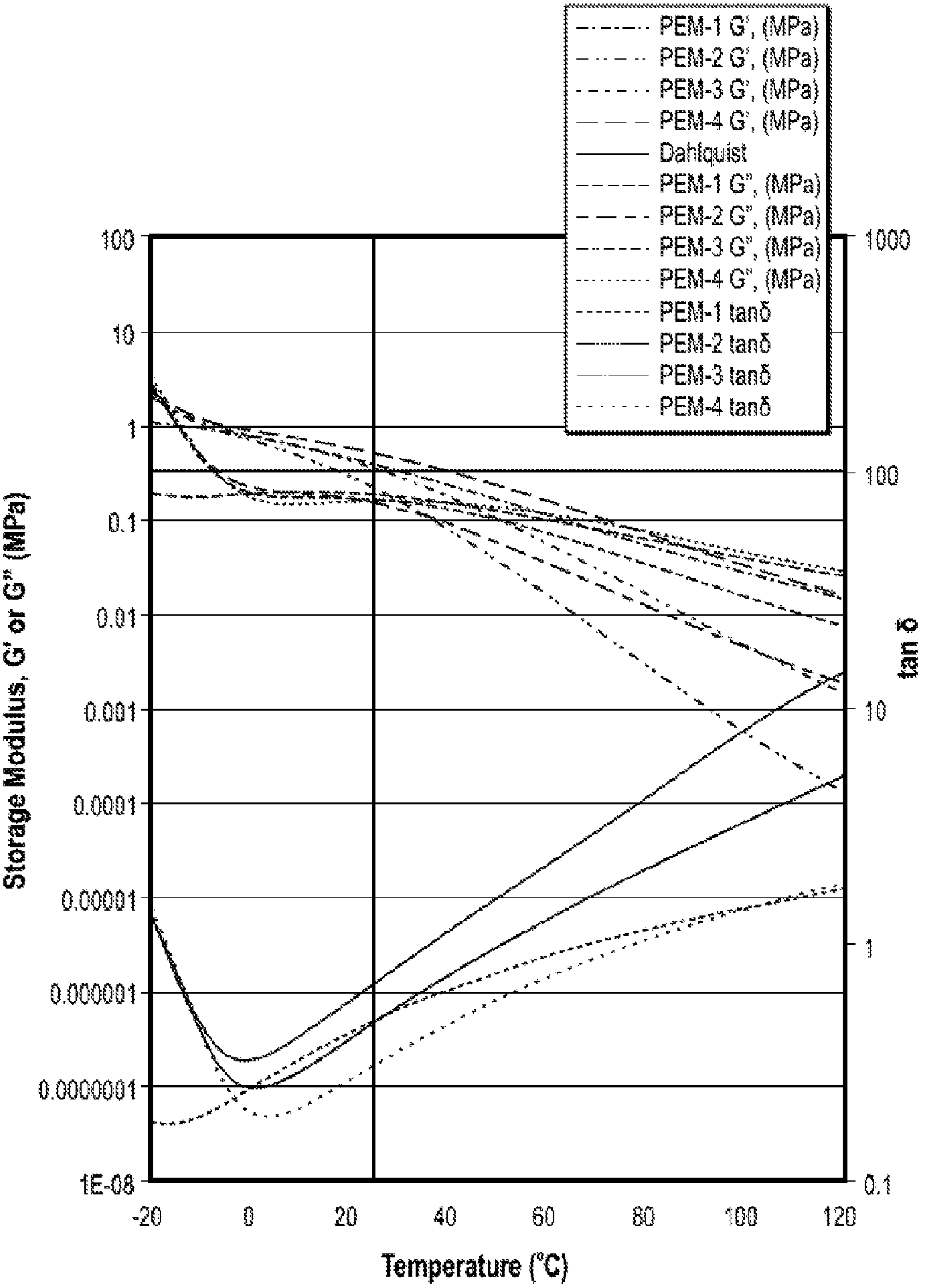
FIG. 7 illustrates the DMA analysis of PEM copolymers with high melt flow rate (MFR).

Adhesive compositions comprising copolymers with a higher MFR can have higher entanglement and more tack strength, thus are suitable in label applications, especially on dirty or oily substrates. FIG. 7 is the DMA analysis for PEM-1, PEM-2, PEM-3, and PEM-4 along with the Dahlquist criterion (See Dahlquist, C. A. in: Adhesion: Fundamentals and Practice 1966, MacLaren, London). For example, PEM-4 copolymer has a MFR of 32 g/10 min. DMA analysis of PEM-4, as shown in FIG. 7, indicates a storage modulus plateau of $10^5$ Pa to $10^6$ Pa under a temperature of −10° C. to 25° C.

Figure 8:
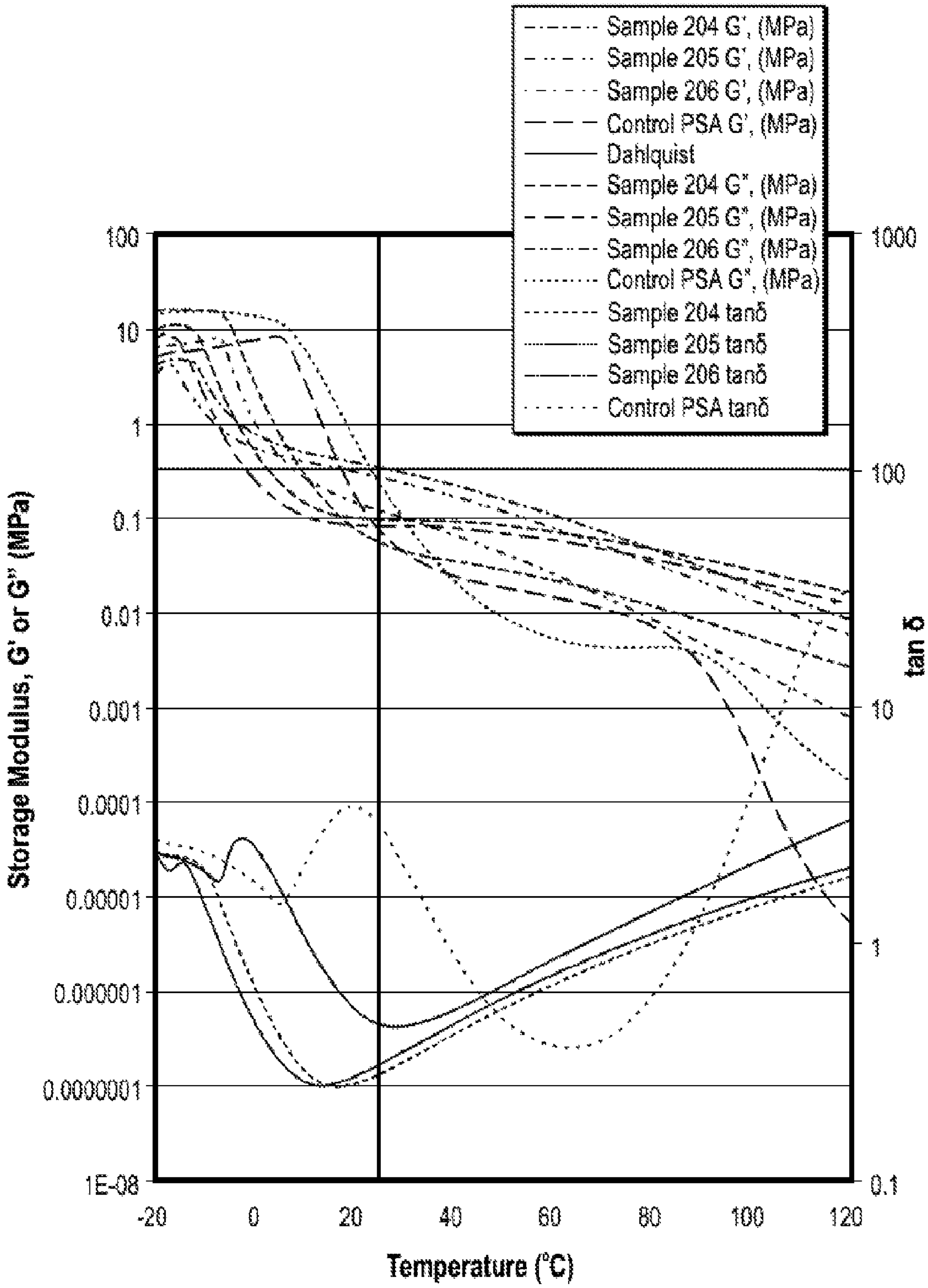
FIG. 8 illustrates the DMA analysis of PSAs comprising a high MFR PEM copolymer, in comparison with PSAs comprising commercially available polymers.

The PEM-4 adhesive compositions (Samples 204, 205, and 206) and control adhesive compositions (Samples 201, 202, and 203) are listed in Table 3, with the oil being PRIMOL™ 352, and the antioxidant being IRGANOX® 1010. Adhesive compositions comprising PEM-4 copolymer are prepared by hot melt coating in comparison to other comparative adhesive compositions comprising commercially available polymers VECTOR® 4186A and VISTAMAXX™ 6202. The adhesive layer thickness is 0.011 inch (0.279 mm). The viscosity of the adhesive composition comprising PEM-4 copolymer measured at 190° C. is 36350 cP, determined by a Brookfield Viscometer. The DMA analysis of such adhesive composition (FIG. 8) shows a storage modulus G' plateau of $10^5$ to $10^6$ Pa under at least one temperature of about −10° C. to about 25° C. that overlaps with the preferred PSA window.

TABLE 3

| Adhesive Compositions | | | | | |
|---|---|---|---|---|---|
| Sample | Copolymer | Tackifier | Oil | Antioxidant | Coating Comments |
| 201 | VECTOR ® 4186A, 34.9 wt % VISTAMAXX ™ 6202, 15 wt % | ESCOREZ ™ 5600, 19.9 wt % | 29.9 wt % | 0.3 wt % | Hot melt coated |
| 202 | VECTOR ® 4186A, 49.9 wt % | ESCOREZ ™ 5600, 19.9 wt % | 29.9 wt % | 0.3 wt % | Hot melt coated |
| 203 | VECTOR ® 4186A, 34.9 wt % VISTAMAXX ™ 6202, 15 wt % | ESCOREZ ™ 5380, 19.9 wt % | 29.9 wt % | 0.3 wt % | Hot melt coated |
| 204 | PEM-4, 77.5 wt % | ESCOREZ ™ 5380, 22.1 wt % | 0 wt % | 0.3 wt % | Too viscous to hot melt coat |
| 205 | PEM-4, 73.1 wt % | ESCOREZ ™ 5380, 20.9 wt % | 5.7 wt % | 0.3 wt % | Too viscous |
| 206 | PEM-4, 40.5 wt % Used less polymer, more oil to get to a viscosity that could be coated well | ESCOREZ ™ 5380, 45.5 wt % | 13.5 wt % | 0.5 wt % | Hot melt coated onto MYLAR ™ |

Table 4 illustrates the properties of adhesive compositions presented in Table 3. The adhesive compositions 204 and 205 show a viscosity of more than 50,000 cP at 190° C., which is too viscous due to the higher amount of PEM copolymer in the formulation. The adhesive composition 206 has an average peel force of 4000 g, an average tack force of 490 g, and an average static shear of 140 min (minutes to failure at 500 g load), all values based on at least 3 repeated tests. The adhesive composition 206, in comparison to adhesive compositions 201 to 203, has a combination of high peel force and high tack force, which is desirable for applications that requires a strong adhesion.

TABLE 4

| Properties of Adhesive Compositions | | | | | |
|---|---|---|---|---|---|
| Sample | Viscosity (at 190° C.) (cP) | Thickness (mm) | Peel Force (g) | Tack Force (g) | Static Shear (min) |
| 201 | 40850 | 0.279 | 400 | 85 | 4000 |
| 202 | 5860 | 0.279 | 1100 | 180 | 4000 |
| 203 | 34700 | 0.279 | 380 | 67 | 4000 |
| 206 | 36350 | 0.279 | 4000 | 490 | 140 |

Figure 9:
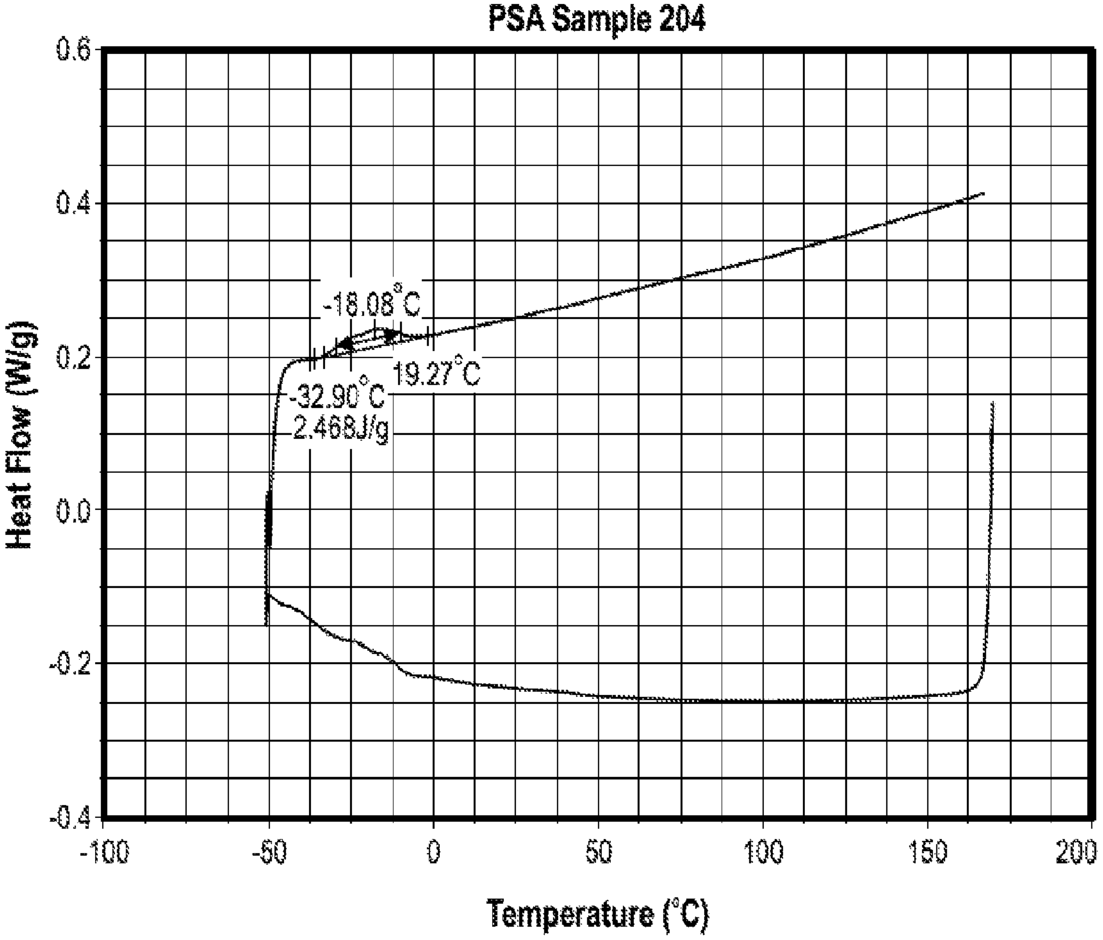
FIGS. 9-11 are differential scanning calorimetry (DSC) plots for three adhesive compositions of the present disclosure.
Figure 10:
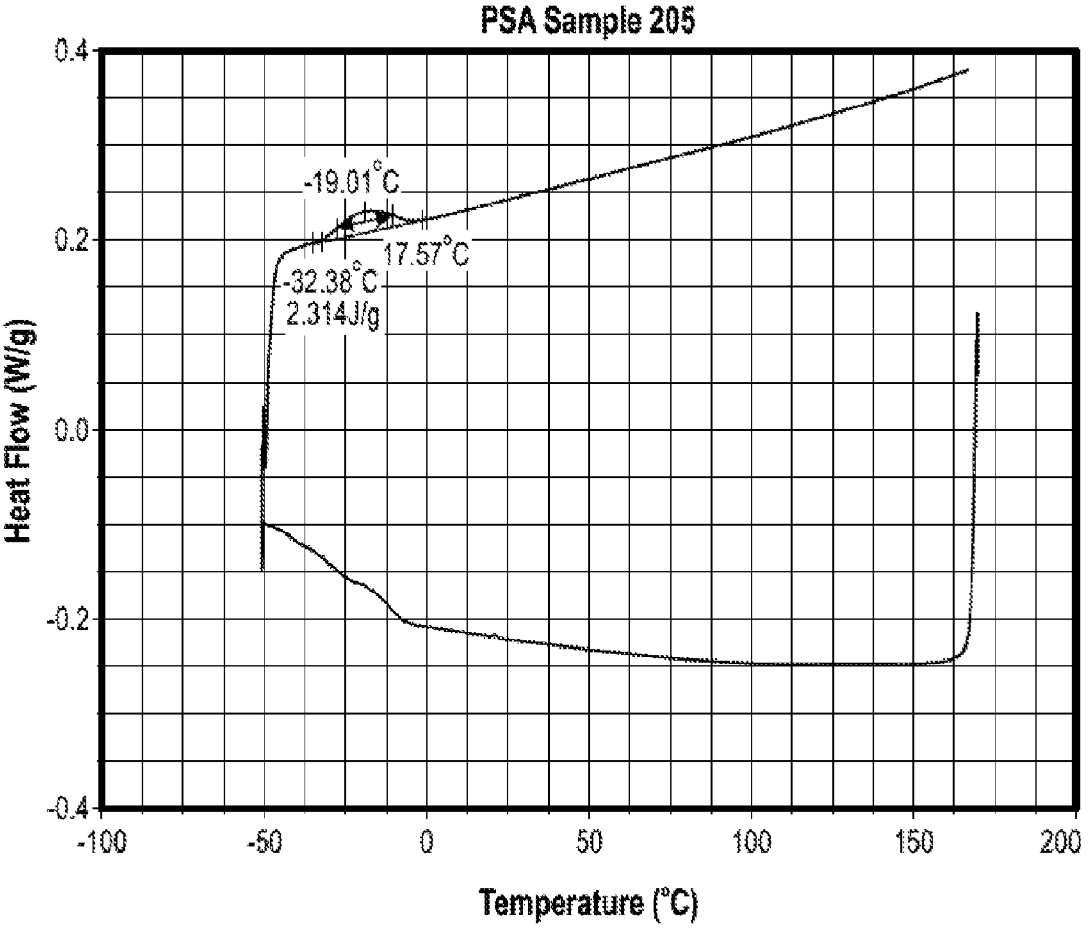
Figure 11:
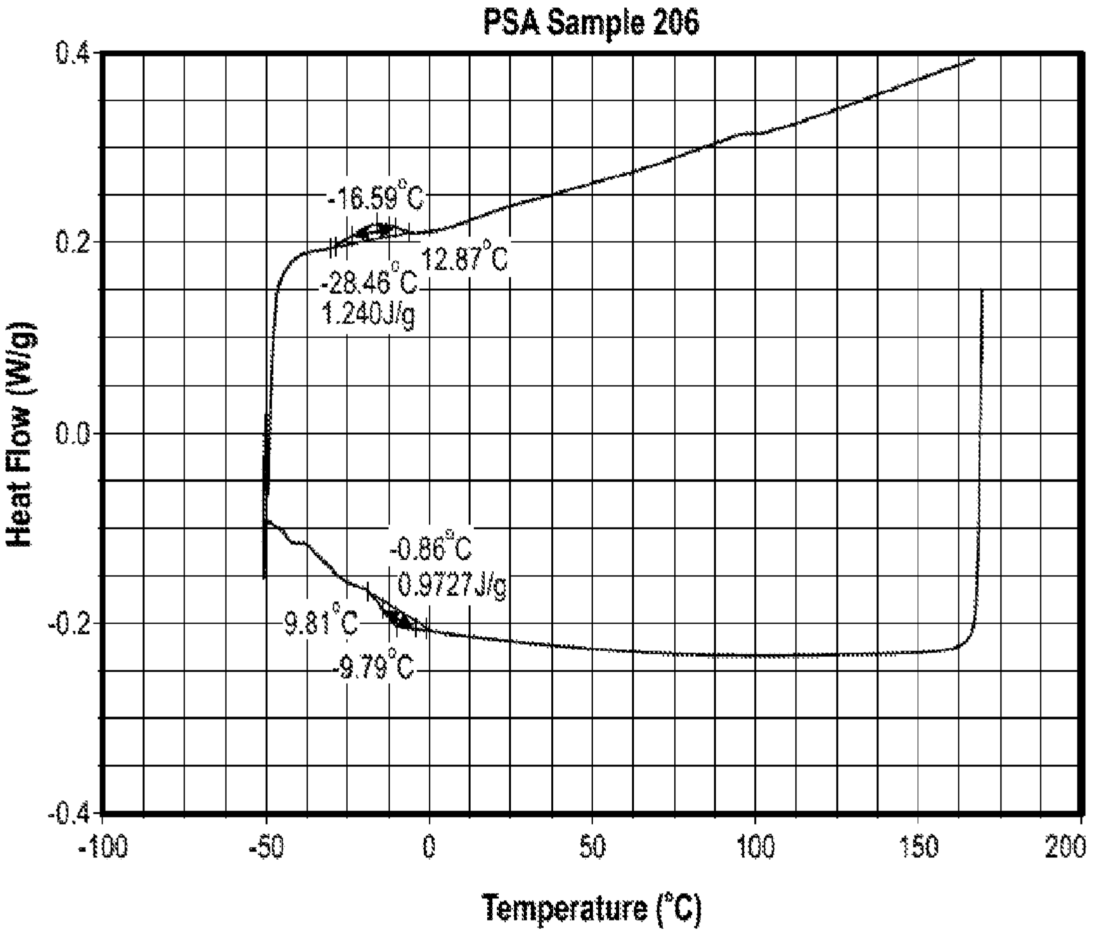

FIGS. 9-11 are the DSC plots for samples 204, 205, and 206, respectively, illustrating the amorphous nature of these blends. For these samples, the DSC method used was as follows. Samples weighing approximately 3-5 mg are kept in an aluminum sample pan and hermetically sealed. These are gradually heated to 170° C. at a rate of 10° C./min and thereafter, held at 170° C. for 3 minutes. They are subsequently cooled to −50° C. at a rate of 10° C./minute and held isothermally for 3 minutes at −50° C. This is followed by a second heating cycle wherein the samples are heated to 170° C. at 10° C./min. Results from the second cycle thermal events are recorded. During the second heating cycle, appearance of melting indicates crystallinity and thus measured heat of fusion is used to compute the crystallinity, unless otherwise indicated. The thermal output, recorded as the area under the melting peak of the sample, is a measure of the heat of fusion and may be expressed in Joules per gram of polymer. The melting point is recorded as the temperature of the greatest heat absorption within the range of melting of the sample relative to a baseline measurement for the increasing heat capacity of the polymer as a function of temperature.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A pressure-sensitive adhesive comprising:

about 18 wt % to about 90 wt % of a propylene-ethylene (-diene) (PEDM) copolymer comprising (a) about 60 wt % to about 99 wt % propylene, (b) about 1 wt % to about 40 wt % ethylene or a C4 to C22 alpha-olefin, and (c) about 0.5 wt % to about 5 wt % diene, wherein the PEDM copolymer has a heat of fusion of about 15 J/g or less; about 10 wt % to about 65 wt % of a tackifier; and about 5 wt % to about 40 wt % of an oil, wherein the wt % propylene, the wt % ethylene, and the wt % C4 to C22 alpha-olefin are uncorrected wt % numbers, which is based on total weight of propylene, ethylene, and C4 to C22 alpha olefin in the PEDM copolymer, and wherein the wt % diene is a corrected wt % number, which is based on total weight of propylene, ethylene, C4 to C22 alpha-olefin, and diene in the PEDM copolymer.

2. The pressure-sensitive adhesive of claim 1, wherein the PEDM copolymer has a heat of fusion of about 8 J/g or less.

3. The pressure-sensitive adhesive of claim 1, wherein the PEDM copolymer has a heat of fusion of about 1 J/g or less.

4. The pressure-sensitive adhesive of claim 1, wherein the C4 to C22 alpha-olefin is a C4 to C12 alpha-olefin.

5. The pressure-sensitive adhesive of claim 1, wherein the PEDM copolymer has a melt flow rate (2.16 kg at 230° C.) of about 0.1 g/10 min or greater.

6. The pressure-sensitive adhesive of claim 1, wherein the PEDM copolymer has a melt flow rate (2.16 kg at 230° C.) of about 10 g/10 min or less, and wherein the pressure-sensitive adhesive further comprises a solvent.

7. The pressure-sensitive adhesive of claim 1, wherein the PEDM copolymer has a melt flow rate (2.16 kg at 230° C.) of about 5 g/10 min to about 30 g/10 min.

8. The pressure-sensitive adhesive of claim 1, wherein the PEDM copolymer has a Mooney viscosity (ML(1+4) 125° C.) about 5 MU to about 100 MU.

9. The pressure-sensitive adhesive of claim 1, wherein the PEDM copolymer has a glass transition temperature of about −50° C. to about −15° C.

10. The pressure-sensitive adhesive of claim 1, wherein the PEDM copolymer has a glass transition temperature greater than or equal to −7.886−(87.98*E)+(294*D) and less than or equal to −0.886−(87.98*E)+(294*D) wherein E is the mole fraction of ethylene in the polymer and D is the mole fraction of diene in the polymer.

11. The pressure-sensitive adhesive of claim 1, wherein the tackifier is selected from the group consisting of a saturated tackifier, an aliphatic tackifier, an aromatic modified tackifier, and any combination thereof.

12. The pressure-sensitive adhesive of claim 1, wherein the pressure-sensitive adhesive has a clear visual determination.

13. The pressure-sensitive adhesive of claim 1, wherein the pressure-sensitive adhesive has a tack force of about 1 g to about 1800 g on low density polyethylene, according to PSTC-16 Method B.

14. The pressure-sensitive adhesive of claim 1, wherein the pressure-sensitive adhesive has a tack force of about 1 g to about 500 g on stainless steel, according to PSTC-16 Method B.

15. The pressure-sensitive adhesive of claim 1, wherein the pressure-sensitive adhesive has a peel force of about 700 g to about 2000 g at 90° ramp angle on low density polyethylene according to PSTC-101.

16. The pressure-sensitive adhesive of claim 1, wherein the pressure-sensitive adhesive has a peel force of about 100 g to about 5000 g at 90° ramp angle on stainless steel according to PSTC-101.

17. The pressure-sensitive adhesive of claim 1, wherein the pressure-sensitive adhesive has a static shear adhesion time to low density polyethylene of about 60 min to about 200 min with a 1000 g weight and 0.5 in.×0.5 in. surface area according to PSTC-107.

18. The pressure-sensitive adhesive of claim 1, wherein the pressure-sensitive adhesive has a static shear adhesion time to stainless steel of about 1 min to about 200 min with a 1000 g weight and 0.5 in.×0.5 in. surface area according to PSTC-107.

19. The pressure-sensitive adhesive of claim 1, comprising:

about 40.5 wt % of the PEDM copolymer; about 35 wt % to about 50.5 wt % of the tackifier; and about 8.5 wt % to about 24 wt % of the oil.

* * * * *